United States Patent
Muddiman et al.

(10) Patent No.: US 10,259,276 B2
(45) Date of Patent: Apr. 16, 2019

(54) DETERMINING VEHICULAR WHEEL POSITIONS FROM TIRE PRESSURE MONITORING SYSTEM SIGNALS

(71) Applicant: NXP USA, INC., Austin, TX (US)

(72) Inventors: Matthew Wayne Muddiman, Gilbert, AZ (US); Albert Stanislavovich Chekanov, Chandler, AZ (US); Camille Maryse Saint-Jean, Toulouse (FR); Zbigniew Baranski, Queen Creek, AZ (US); David Blake Munsinger, Austin, TX (US)

(73) Assignee: NXP USA, Inc., Austin, TX (US)

(*) Notice: Subject to any disclaimer, the term of this patent is extended or adjusted under 35 U.S.C. 154(b) by 139 days.

(21) Appl. No.: 15/499,552

(22) Filed: Apr. 27, 2017

(65) Prior Publication Data

US 2018/0111430 A1 Apr. 26, 2018

(30) Foreign Application Priority Data

Oct. 25, 2016 (EP) .................................. 16306403

(51) Int. Cl.
| | |
|---|---|
| *G01M 17/013* | (2006.01) |
| *B60C 23/04* | (2006.01) |
| *G01M 17/06* | (2006.01) |
| *B60C 23/06* | (2006.01) |
| *B60C 19/00* | (2006.01) |

(52) U.S. Cl.
CPC ...... *B60C 23/0488* (2013.01); *B60C 23/0416* (2013.01); *B60C 23/0435* (2013.01); *B60C 23/061* (2013.01); *G01M 17/013* (2013.01); *G01M 17/06* (2013.01); *B60C 2019/004* (2013.01)

(58) Field of Classification Search
USPC ........................................ 73/115.07, 115.08
See application file for complete search history.

(56) References Cited

U.S. PATENT DOCUMENTS

| | | | |
|---|---|---|---|
| 6,446,502 B1 | 9/2002 | Normann et al. | |
| 8,700,286 B2 | 4/2014 | Steiner et al. | |
| 8,760,277 B2 | 6/2014 | Kessler et al. | |

(Continued)

FOREIGN PATENT DOCUMENTS

| | | |
|---|---|---|
| DE | 19735686 A1 | 2/1999 |
| DE | 10012458 A1 | 9/2001 |
| EP | 2586633 A1 | 5/2013 |

*Primary Examiner* — Eric S. McCall
(74) *Attorney, Agent, or Firm* — Charlene R. Jacobsen

(57) ABSTRACT

A system includes sensor modules, each associated with a wheel on a vehicle, and a receiver unit. Each sensor module calculates a rotation period associated with the wheel during turn mode vehicular motion and determines rotation direction of the associated wheel during straight vehicular motion. A data packet that includes a unique identifier for the sensor module, the rotation period, and the rotation direction are transmitted from each sensor module for receipt at the receiver unit. The receiver unit determines the steered wheels and non-steered wheels based on the rotation period, and the receiver unit can determine which wheels are on the right side or the left side of the vehicle based on the rotation direction. Knowledge of the steered and non-steered wheels and the rotation direction of the wheels, enables the receiver unit to assign locations of the sensor modules, and hence positions of the wheels of the vehicle.

16 Claims, 14 Drawing Sheets

(56) References Cited

U.S. PATENT DOCUMENTS

| | | |
|---|---|---|
| 9,139,052 B2 | 9/2015 | Steiner et al. |
| 9,278,590 B2 | 3/2016 | Friel et al. |
| 2003/0042890 A1 | 3/2003 | Normann et al. |
| 2013/0085710 A1 | 4/2013 | Kautzsch |

FIG. 15

| PARTIAL LOCALIZATION: ROTATION PERIOD | | | |
|---|---|---|---|
| VEHICLE MOTION: LEFT TURN | | | |
| TPMS ID | WHEEL ID | LONGEST ROTATION PERIOD | SHORTEST ROTATON PERIOD |
| A | AA | | STEERED WHEEL |
| B | BB | | |
| C | CC | NON-STEERED WHEEL | |
| D | DD | | |

| PARTIAL LOCALIZATION: ROTATION PERIOD | | | |
|---|---|---|---|
| VEHICLE MOTION: RIGHT TURN | | | |
| TPMS ID | WHEEL ID | LONGEST ROTATION PERIOD | SHORTEST ROTATON PERIOD |
| A | AA | | |
| B | BB | NON-STEERED WHEEL | |
| C | CC | | |
| D | DD | | STEERED WHEEL |

WHEEL POSITION ASSIGNMENTS

| WHEEL ID | |
|---|---|
| AA | FRONT-RIGHT |
| BB | BACK-RIGHT |
| CC | BACK-LEFT |
| DD | FRONT-LEFT |

DETERMINING VEHICULAR WHEEL POSITIONS FROM TIRE PRESSURE MONITORING SYSTEM SIGNALS

CROSS-REFERENCE TO RELATED APPLICATIONS

This application claims the priority under 35 U.S.C. § 119 of European patent application no. 16306403.3, filed Oct. 25, 2016 the contents of which are incorporated by reference herein.

TECHNICAL FIELD OF THE INVENTION

The present invention relates generally to auto-location of a wheel in a vehicle. More specifically, the present invention relates to a system and method for determining vehicular wheel positions from tire pressure monitoring system signals.

BACKGROUND OF THE INVENTION

Tire pressure monitoring systems (TPMS) on vehicles are generally required in the United States, and are increasingly being implemented in Europe and Asia. Typically the TPMS sets a pressure warning threshold level which is monitored by wheel-based TPMS modules. The TPMS modules are mounted inside of each wheel, such as on the rim, valve, or in-tire, in order to periodically or continuously monitor the inflation pressure of the tire. A TPMS module typically includes a pressure sensor, a microcontroller, a power source such as a battery, and a radio frequency (RF) transmitter that communicates pressure readings from the pressure sensor to a central TPMS receiver unit mounted elsewhere in the vehicle.

The process of identifying which TPMS module sent a particular signal, and therefore which wheel may have low tire pressure, is called localization. When a low tire pressure situation is communicated to the TPMS receiver unit, it is highly desirable to know which tire is low instead of simply knowing that one of the tires has low pressure. Effective and efficient localization of TPMS modules, and therefore localization of the associated wheels, is an ongoing challenge because wheels are frequently rotated and/or changed out between summer and winter, thereby changing their positions.

In order to complete the task of assigning a location to each TPMS module, and therefore assigning a position to each associated wheel, present techniques consume long periods of time due to relying on statistically-significant sample sizes of sensor data, and/or they consume large amounts of battery power due to relying on significantly different signal strengths, high quantities of RF transmissions, long computation times, and so forth.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

FIG. 15 shows a chart of another example outcome of the execution of the wheel position assignment process of FIG. 10.

DETAILED DESCRIPTION

In overview, embodiments disclosed herein entail a system and methodology for determining vehicular wheel positions from tire pressure monitoring system signals. More particularly, the system and methodology enable calculation of rotation period and rotation direction of the wheels on a vehicle at each tire pressure monitoring system (TPMS) module associated with each wheel. The rotation period and rotation direction are received from each TPMS modules at a central receiver unit of the TPMS system. The receiver unit can readily determine which wheels are on the right side or left side of the vehicle based on rotation direction and which wheels are steered wheels and non-steered wheels based on the rotation period. Accordingly, the receiver unit can assign locations of the TPMS modules, and hence positions of the wheels of the vehicle, time efficiently and using minimal power due to eliminating the need for timestamping and averaging.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued. It should be further understood that the use of relational terms, if any, such as first and second, top and bottom, and the like are used solely to distinguish one from another entity or action without necessarily requiring or implying any actual such relationship or order between such entities or actions.

Figure 1:
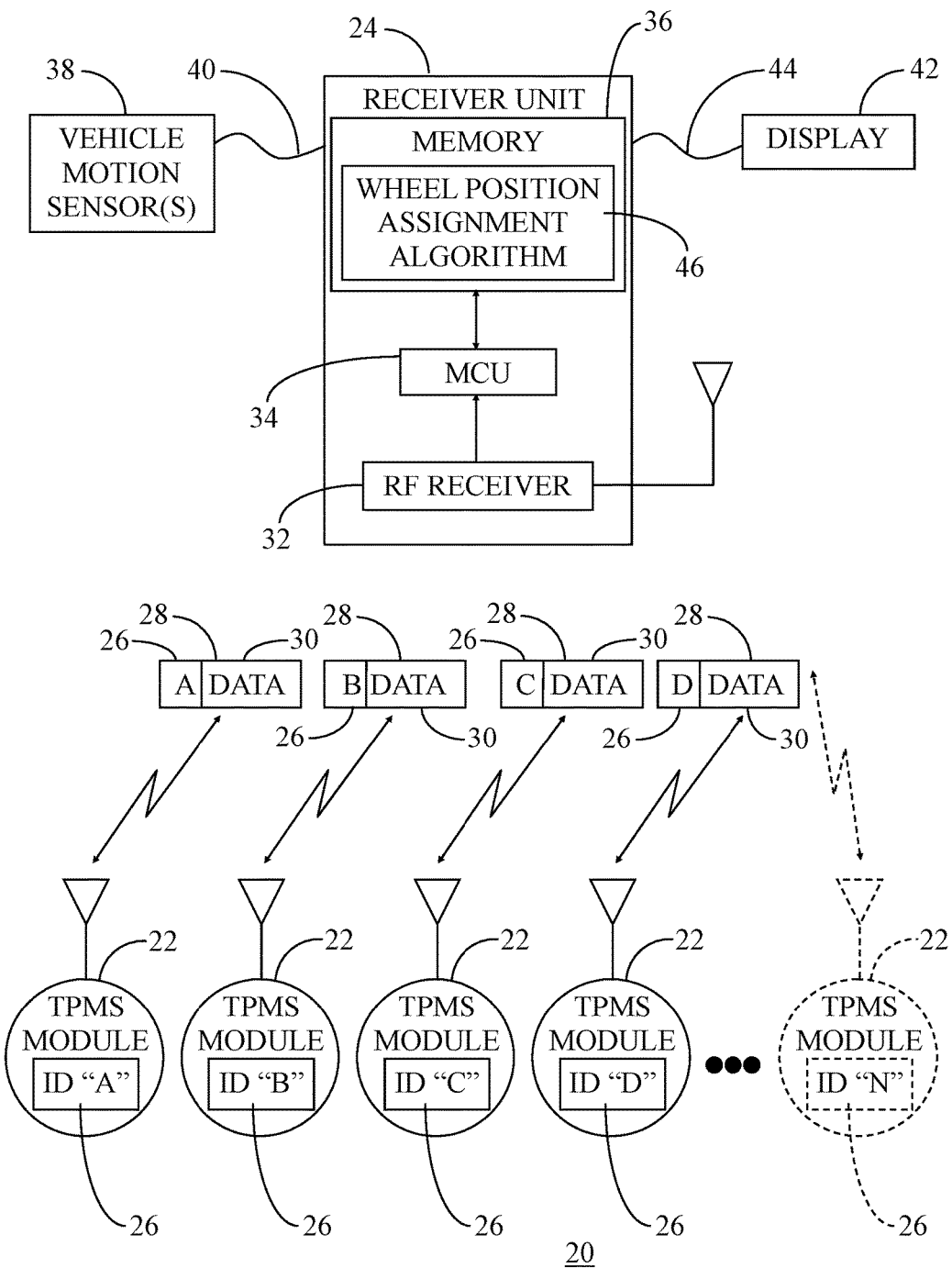
FIG. 1 shows a block diagram of a system for determining positions of wheels on a vehicle in accordance with an embodiment.

Referring to FIG. 1, FIG. 1 shows a block diagram of a system 20 for determining positions of wheels on a vehicle in accordance with an embodiment. System 20 generally includes a plurality of sensor modules, referred to herein as TPMS modules 22, in radio frequency (RF) communication with a receiver unit 24. Each TPMS module 22 has a unique identifier 26 and is mounted inside of each wheel (not shown), such as on the rim, valve, or in-tire. As will be discussed in significantly greater detail below, each TPMS module 22 transmits data packets 28 to receiver unit 24. Data packets 28 include unique identifier 26 associated with the particular TPMS module 22 and output data 30, examples of which will be described in connection with FIG. 2. FIG. 1 explicitly shows four TPMS modules 22. However, ellipses and one of TPMS modules 22 shown in ghost form indicate that the quantity of TPMS modules 22 coincides with the quantity of wheels on the vehicle.

Receiver unit 24 generally includes an RF receiver 32 for receiving data packets 28, a microcontroller 34 (MCU) in communication with RF receiver 32, and a memory unit 36 associated with MCU 34. Receiver unit 24 may be in communication with vehicle motion sensor(s) 38 via, for example, a serial link 40. Additionally, receiver unit 24 may be in communication with an in-vehicle display unit 42 via, for example, a serial link 44. Memory unit 36 may be a non-volatile memory device in which a wheel position assignment algorithm 46 is stored, in accordance with an embodiment. Those skilled in the art will recognize that memory unit 36 may include other software that provides control, monitoring, and data manipulation that will not be discussed herein for brevity. In general, data packets 28 are received at RF receiver 32 of receiver unit 24. Thereafter, MCU 34 executes wheel position assignment algorithm 46 in order to interpret output data 30 contained in data packets 28. This information may then be presented to the driver of a vehicle via display 42 (discussed below).

Figure 2:
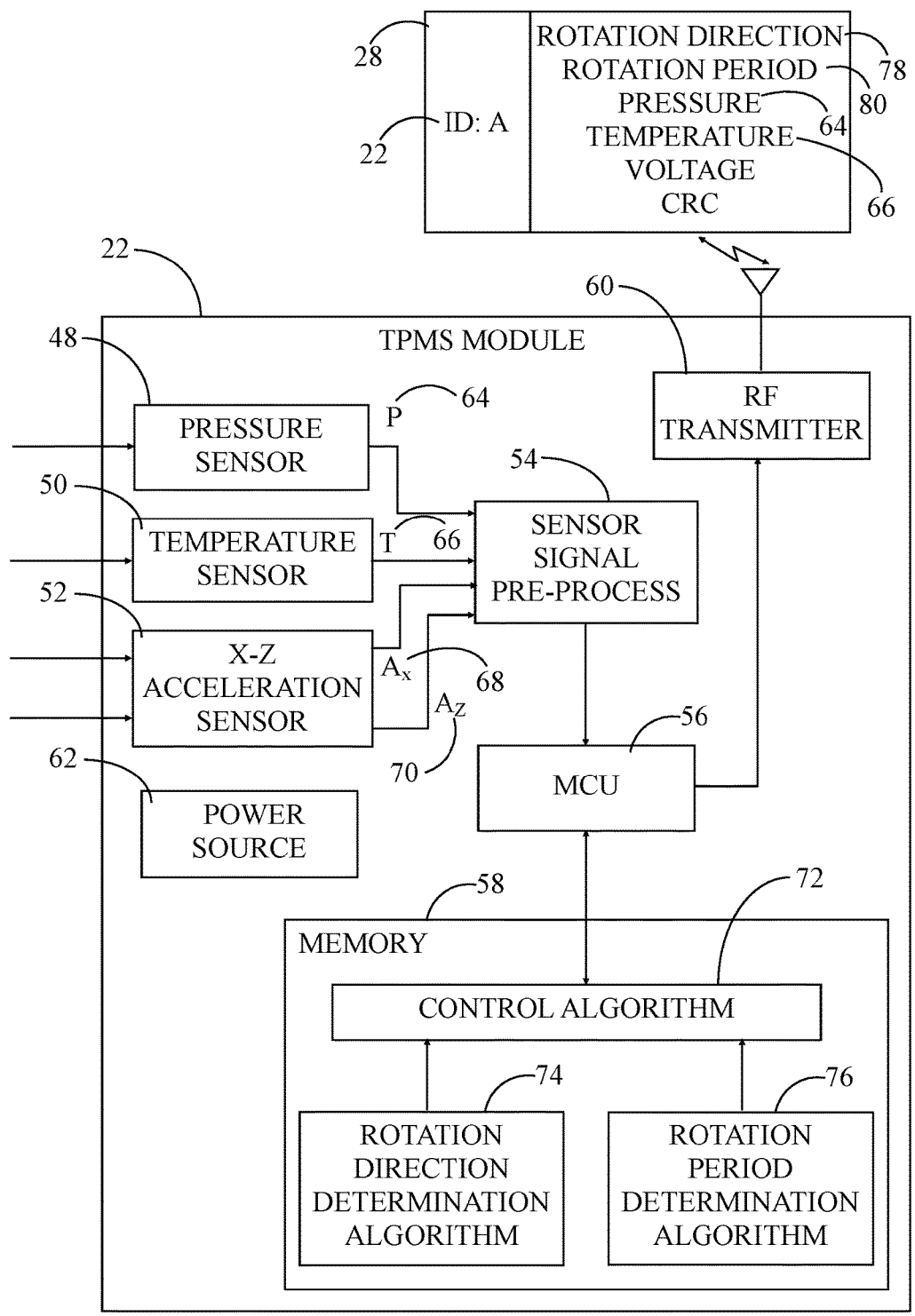
FIG. 2 shows a block diagram of a tire pressure sensor system (TPMS) module of the system of FIG. 1.

FIG. 2 shows a block diagram of one of TPMS modules 22 of system 20 (FIG. 1). TPMS module 22 includes a pressure sensor 48, a temperature sensor 50, and an acceleration sensor 52. TPMS module 22 additionally includes control circuitry such as, for example, sensor signal pre-processing circuitry 54, a microcontroller 56 (MCU), a memory unit 58, an RF transmitter 60, and a power source 62.

Pressure sensor 48 is used to monitor the pressure of the tire and periodically produce a pressure signal 64, P. Temperature sensor 50 is used to monitor the ambient temperature at the tire and periodically produce a temperature signal 66, T. In an embodiment, acceleration sensor 52 is a dual axis accelerometer. Thus, acceleration sensor 52 can be used to detect X-axis acceleration, referred to herein as tangential acceleration, and produce a tangential acceleration signal 68, labeled $A_X$. Additionally, acceleration sensor 52 can be used to detect Z-axis acceleration, referred to herein as radial acceleration, and produce a radial acceleration signal 70, labeled $A_Z$. In some embodiments, tangential and radial acceleration are measured directly. In other configurations, for example, when TPMS modules 22 are implemented as a replacement for the valve stem cap or TPMS modules 22 are affixed to the inside of the tire, the accelerometers will be out-of-plane. That is, tangential and radial accelerations may be suitably computed or processed to obtain tangential and radial signals 68, 70. In accordance with an embodiment, tangential acceleration signal 68 and radial acceleration signal 70 are used to facilitate localization of TPMS module 22 and thereby determine the position of each of the wheels of a vehicle.

In general, pressure signal 64, temperature signal 66, tangential acceleration signal 68, and radial acceleration signal 70 are received at sensor signal pre-processing circuitry 54 where the signals 64, 66, 68, 70 are suitably processed (e.g., filtered, amplified, digitized, etc.). Thereafter, the processed signals 64, 66, 68, 70 are received at and processed by MCU 56. MCU 56 executes a control algorithm 72 to acquire and interpret signals 64, 66, 68, 70 and to enable transmission of data packets 28.

Through the execution of control algorithm 72, a rotation direction algorithm 74 may be executed to determine a rotation direction of the associated wheel. The rotation direction is a clockwise or a counterclockwise rotation direction of the wheel taken from the perspective of acceleration sensor 52. By way of example, when the vehicle is moving in the forward direction, the wheels on the left side of the vehicle rotate in a counterclockwise direction from the perspective of acceleration sensor 52 and the wheels on the right side of the vehicle rotate in a clockwise direction from the perspective of acceleration sensor 52. The opposite situation is true when the vehicle is moving in the reverse direction. Accordingly, rotation direction algorithm 74 may be executed to partially localize the wheels by producing data that can be used to determine on which side of the vehicle they are located.

Further, through the execution of control algorithm 72, a rotation period determination algorithm 76 may be executed to determine a rotation period of the associated wheel, or the rotation period may be extrapolated based on a partial revolution of the wheel. The rotation period is the amount of time it takes for the associated wheel to make one full revolution.

In general, a vehicle includes steered wheels and non-steered wheels. The steered wheels are defined herein as being the wheels at one end of the vehicle which are connected to each other and to a steering mechanism. Thus, the steered wheels are used to change or maintain the heading of the vehicle. Conversely, the non-steered wheels are defined as being the wheels that follow or respond to the steered wheels. Typically, in automobiles, trucks, and the like, the steered wheels are the front wheels and the non-steered wheels are the back wheels. Thus, the vehicular application described herein may alternatively refer to the steered wheels as being the front wheels and the non-steered wheels as being the rear wheels for simplicity. However, it should be understood that the term "steered wheels" is not limited to the front wheels and the term "non-steered wheels" is not limited to the back wheels.

When a vehicle is in a turn, the steered wheels follow a longer path than the non-steered wheels. Thus, the steered wheels rotate with shorter periods (i.e., rotate faster) than the non-steered wheels, regardless of the vehicle's direction. Accordingly, rotation period determination algorithm 76 may be executed to partially localize the wheels by producing data that can be used to distinguish the steered wheels (e.g., front wheels) from the non-steered wheels (e.g., back wheels).

Periodically, RF transmitter 60, in communication with MCU 56, outputs data packets 28. In response to the execution of control algorithm 72, and the associated rotation direction determination and rotation period determination algorithms 74, 76, these data packets 28 can include unique identifier 26 for TPMS module 22, rotation direction data 78 and rotation period data 80. Additionally, data packets 26 can include pressure signal 64, temperature signal 66, and so forth. Those skilled in the art will recognize that data packets 26 may include other sensor information detailing, for example, voltage, characteristics of the tire, wheel, and environment, and so forth. This additional sensor information is not discussed in detail herein for brevity.

Figure 3:
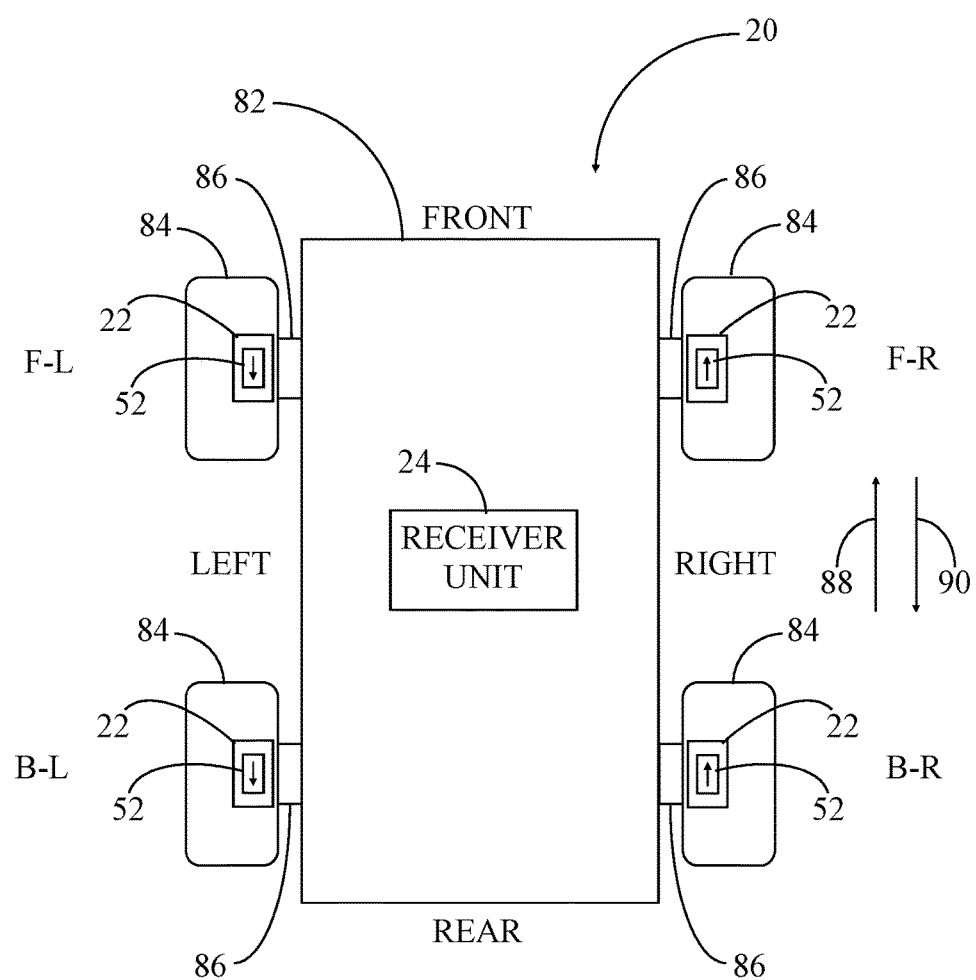
FIG. 3 shows the system of FIG. 1 implemented on a vehicle.

FIG. 3 shows system 20 implemented on a vehicle 82. In particular, individual wheels 84 are mounted to vehicle 82 via an axle 86, and one each of TPMS modules 22 is associated with one each of wheels 84 of vehicle 82. Receiver unit 24 is located at any suitable location within vehicle 82. Acceleration sensor 52 of each respective front-right and back-right wheel 84 may be mounted such that a positive X-axis of acceleration sensor 52 is exposed when vehicle 82 moves in a forward direction. Conversely, acceleration sensor 52 of each respective front left and back left wheel 84 may be mounted such that a negative X-axis of acceleration sensor 52 is exposed when vehicle 82 moves in the forward direction.

Accordingly, radial acceleration signal 70 (FIG. 2) is common to all locations of TPMS modules 22, assuming that TPMS modules are mechanically identical in construction, with the Z-axis pointing toward axle 86. However, acceleration sensors 52 incorporated in wheels 84 on the right side of vehicle 82 produce tangential acceleration signal 68 (FIG. 2) that is inverse with respect to tangential acceleration signal 68 produced by acceleration sensors 52 incorporated in wheels 84 on the left side of vehicle 82. Thus, as vehicle 82 moves in the forward direction, denoted by an arrow 88, acceleration sensors 52 at front-right (F-R) and back-right (B-R) wheels 84 are capable of detecting a clockwise rotation direction and acceleration sensors 52 at front-left (F-L) and back-left (B-L) wheels 84 are capable of detecting a counterclockwise rotation direction. On the other hand, as vehicle 82 moves in the reverse direction, denoted by an arrow 90, acceleration sensors 52 at front-right and back-right wheels 84 are capable of detecting a counterclockwise rotation direction and acceleration sensors 52 at front-left and back-left wheels 84 are capable of detecting a clockwise rotation direction.

Each TPMS module 22 can assess its rotational dynamics, and in particular tangential acceleration signals 68 and radial acceleration signals 70, to determine one of a clockwise and a counterclockwise rotation direction via execution of control algorithm 72 and the rotation direction determination algorithm 74. This rotation direction can thereafter be transmitted from each TPMS module 22. Further, receiver unit 24 can receive and evaluate the rotation direction of each of wheels 84 through the execution of wheel position assignment algorithm 46 (FIG. 1).

It can be readily observed, however, that such a scheme only partially localizes the TPMS modules 22 and their associated wheels 84. That is, this technique can only distinguish wheels 84 on one side of vehicle 82 (right or left) from wheels 84 on the other side of vehicle 82 (left or right). Accordingly, rotation period determination algorithm 76 (FIG. 2) is further executed to determine the rotation period in order to distinguish the steered wheels, e.g., front wheels 84, from the non-steered wheels, e.g., rear wheels 84.

Figure 4:
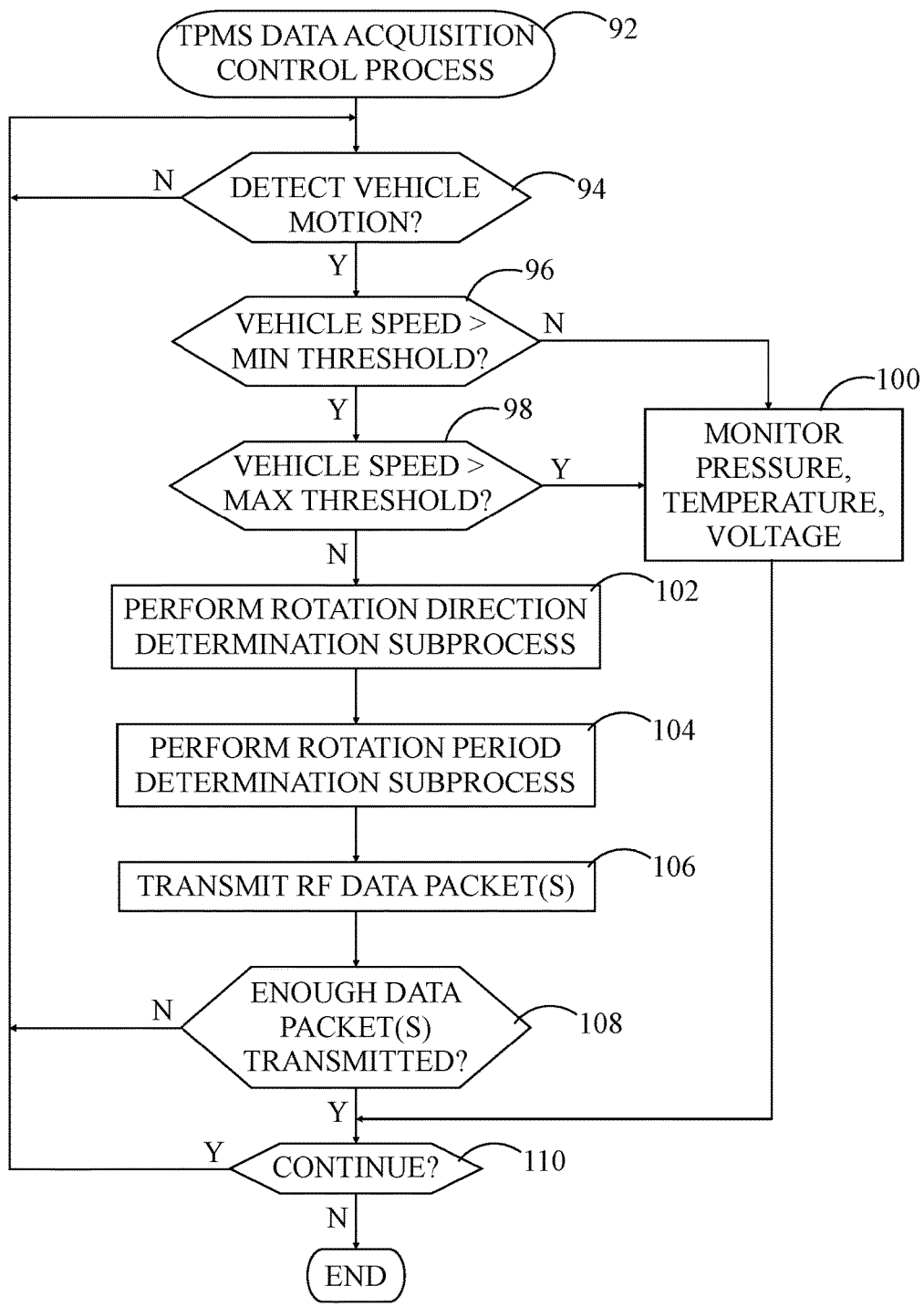
FIG. 4 shows a flowchart of a TPMS data acquisition control process in accordance with an embodiment.

FIG. 4 shows a flowchart of a TPMS data acquisition control process 92 in accordance with an embodiment. In an example, TPMS data acquisition control process 92 details the operations performed through the execution of control algorithm 72 by each MCU 56 of each TPMS module 22. In particular, process 92 is performed to determine rotation direction and rotation period of a particular wheel 84 associated with the particular TPMS module 22 and subsequently transmit rotation direction and rotation period to receiver unit 24 where the data is evaluated in order to assign positions to wheels 84 on vehicle 82.

At a query block 94 of process 92, a determination is made as to whether vehicle 82 (FIG. 3) is in motion. Motion may be detected at TPMS module 22 by, for example, assessing tangential and/or radial acceleration signals 68, 70. When motion is not detected, process control loops back to query block 94 continue monitoring for vehicular motion. However, when motion is detected, process 92 continues with a query block 96.

At query block 96, a determination is made as to whether the speed of vehicle 82 (FIG. 3) exceeds the minimum threshold. In other words, a determination is made at query block 96 as to whether the speed of vehicle 82 is high enough (e.g., greater than zero) to perform subsequent processing operations related to rotation direction and rotation period determination. When the vehicle speed does not exceed a minimum speed threshold, process control continues with a block 100. At block 100, conventional processes associated with tire pressure monitoring may be performed. For example, pressure signal 64, temperature signal 66, voltage and the like may be monitored in accordance with conventional processes. Thereafter, process control loops back to query block 94 to continue monitoring for vehicular motion and vehicular speed. However, when the speed of vehicle 82 exceeds a minimum, process control continues with a query block 98.

At query block 98, a determination is made as to whether the speed of vehicle 82 (FIG. 3) exceeds a maximum threshold. In other words, a determination is made at query block 96 as to whether the speed of vehicle 82 is too high to perform subsequent processing operations. When the vehicle speed is greater than a maximum speed threshold, process control continues with block 100 and loops back to query block 94 to continue monitoring for vehicular motion and vehicular speed. However, when the speed of vehicle 82 is less than the maximum threshold, control process 92 continues with a block 102.

At block 102, a rotation direction determination subprocess is performed. The rotation direction determination subprocess details the operations performed through the execution of rotation direction determination algorithm 74 (FIG. 2) by each MCU 56 of each TPMS module 22. Again, the rotation direction determination subprocess is performed to determine the rotation direction of the wheel (i.e., clockwise or counterclockwise) from the perspective of acceleration sensor 52 (FIG. 2). The rotation direction determination subprocess will be discussed in connection with FIGS. 5-7.

At a block 104, a rotation period determination subprocess is performed. The rotation period determination subprocess details the operation performed through the execution of rotation period determination algorithm 76 (FIG. 2) by each MCU 56 of each TPMS module 22. Again, the rotation period determination process is performed to determine the rotation period of the wheel in order to distinguish steered (front) wheels from non-steered (back) wheels. The rotation period determination subprocess will be discussed in connection with FIGS. 8-9.

At a block 106, TPMS module 22 triggers the output of one or more RF data packets 28 (FIG. 2), in which the RF data packets 28 can include unique identifier 26 (FIG. 1), rotation direction data 78 (FIG. 2), rotation period data 80 (FIG. 2), and/or pressure signal 64, temperature signal 66, and other control signals. At a query block 108, a determination is made as to whether enough data packets 28 have been transmitted from TPMS module 22. This determination can entail a certain quantity of data packets 28, a certain quantity of data packets 28 relative to a period of time, or any other criteria for making such a determination. When enough data packets 28 have not been transmitted to receiver unit 24 or, for example, enough data packets 28 have not been repeated to avoid RF collisions, process control loops back to query block 94 to continue monitoring for vehicular motion and vehicular speed.

However, when a determination is made at query block 108 that enough data packets 28 have been transmitted, control process 92 continues with a block 110. At block 110, a determination is made as to whether TPMS data acquisition control process 92 is to continue. In an actual application, control process 92 may be discontinued after the prescribed quantity of data packets 28 have been transmitted, in order to save power, or may be discontinued whenever vehicle 82 has stopped. Accordingly, when a determination is made at block 110 that TPMS data acquisition control process 92 is to continue, process control loops back to query block 94 to continue monitoring for vehicular motion and vehicular speed. However, when a determination is made that execution of process 92 can be discontinued, process 92 ends.

Accordingly, the implementation of TPMS data acquisition process 92, through the execution of control algorithm 72, rotation direction determination algorithm 74, and rotation period determination algorithm 76 yields data packets 28 transmitted from each TPMS module 22 to receiver unit 24. The transmitted data packets 28 can include rotation direction data 78 and rotation period data 80 that can be evaluated to facilitate localization of TPMS module 22 and thereby determine the position of each of the wheels 84 (FIG. 3) of vehicle 82.

Figure 5:
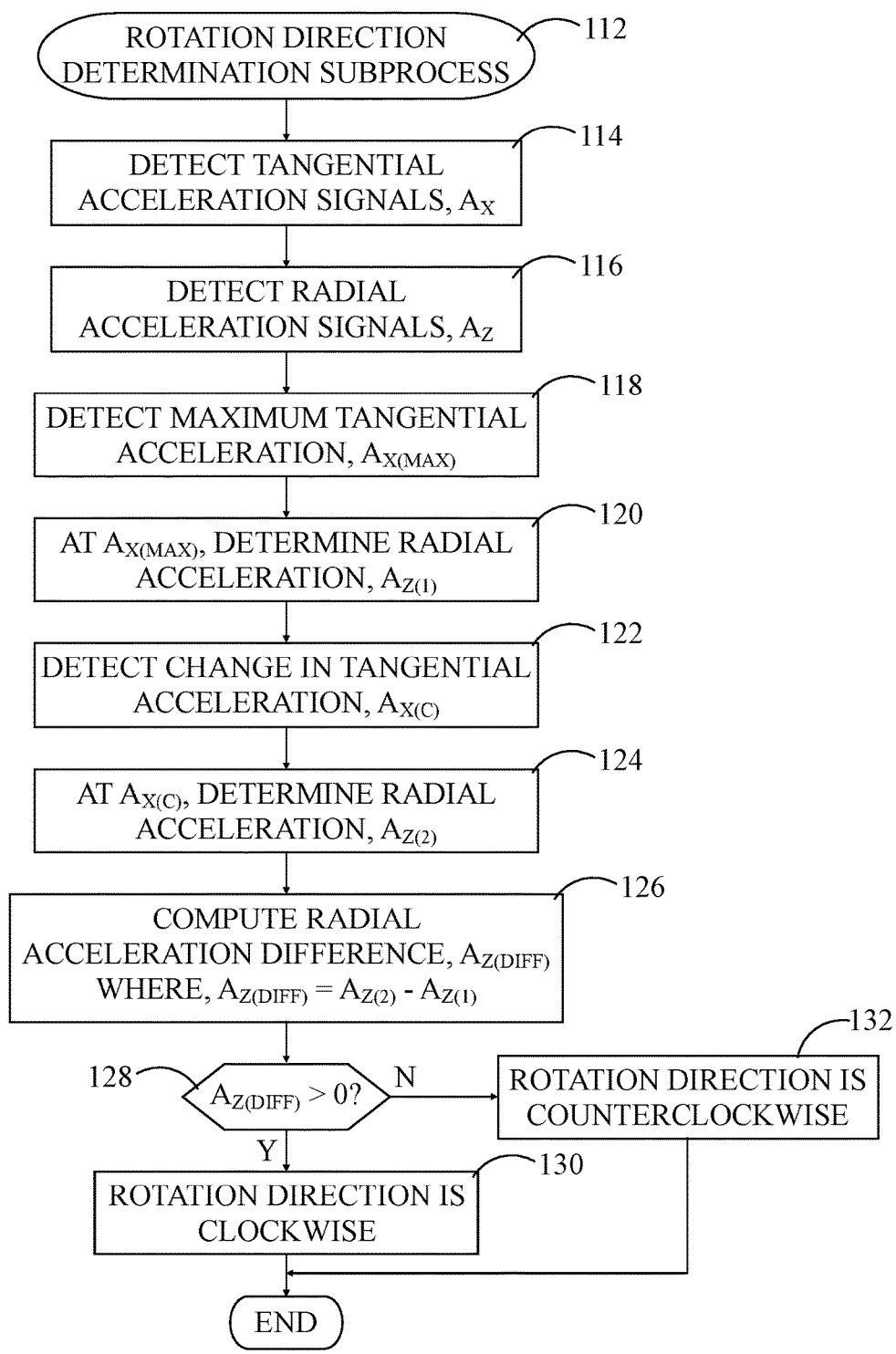
FIG. 5 shows flowchart of a rotation direction determination subprocess of the TPMS data acquisition control process.

FIG. 5 shows flowchart of a rotation direction determination subprocess 112 of the TPMS data acquisition control process 92. In an example, rotation direction determination subprocess 112 details the operations performed through the execution of rotation direction determination algorithm 74 (FIG. 2) by each MCU 56 of each TPMS module 22. In particular, rotation direction determination subprocess 112 is performed during the execution of TPMS data acquisition control process 92 to determine the rotation direction (clockwise or counterclockwise, relative to acceleration sensor 52) of its associated wheel 84 (FIG. 3) utilizing tangential acceleration signal 68 (FIG. 2) and radial acceleration signal 70 (FIG. 2). Although rotation direction is determined using both tangential acceleration signal 68 and radial acceleration signal 70, alternative embodiments may employ a technique in which the rotation direction can be determined at TPMS module 22 using other methods.

At a block 114, tangential acceleration signals 68, $A_X$, are detected at acceleration sensor 52. Concurrently at a block 116, radial acceleration signals, $A_Z$, 70 are detected at acceleration sensor 52. At a block 118, the detected tangential acceleration signals 68 are searched to find a maximum tangential acceleration signal, $A_{X(MAX)}$. By way of example, the maximum tangential acceleration signal, $A_{X(MAX)}$, may be approximately 1 g. At a block 120, a first radial acceleration signal, $A_{Z(1)}$, is determined at the same instant as the detected maximum tangential acceleration signal, $A_{X(MAX)}$, and after normalizing to remove centripetal load.

At a block 122, a change in tangential acceleration signal, $A_{X(C)}$, is detected. For example, the change in tangential acceleration signal, $A_{X(C)}$, may be less than 1 g, but greater than 0 g. At a block 124, a second radial acceleration signal, $A_{Z(2)}$, is determined at the same instant as the detected change in tangential acceleration signal, $A_{X(C)}$. At a block 126, a radial acceleration difference, $A_{Z(DIFF)}$, is computed, where the radial acceleration difference equals the value of the second radial acceleration signal minus the value first radial acceleration signal, $A_{Z(DIFF)}=A_{Z(2)}-A_{Z(1)}$. This computation normalizes the natural centripetal loads and allows small phase differences in the transducers or timing of the samples to be mitigated.

Following computation of the radial acceleration difference, a query block 128 is performed to determine whether the resulting radial acceleration difference, $A_{Z(DIFF)}$, is greater than zero. When the resulting radial acceleration difference is greater than zero, a determination is made at a block 130 that the rotation direction is clockwise. Conversely when the resulting radial acceleration difference is less than zero, a determination is made at a block 132 that the rotation direction is counterclockwise. Thereafter, rotation direction determination subprocess 112 ends.

Figure 6:
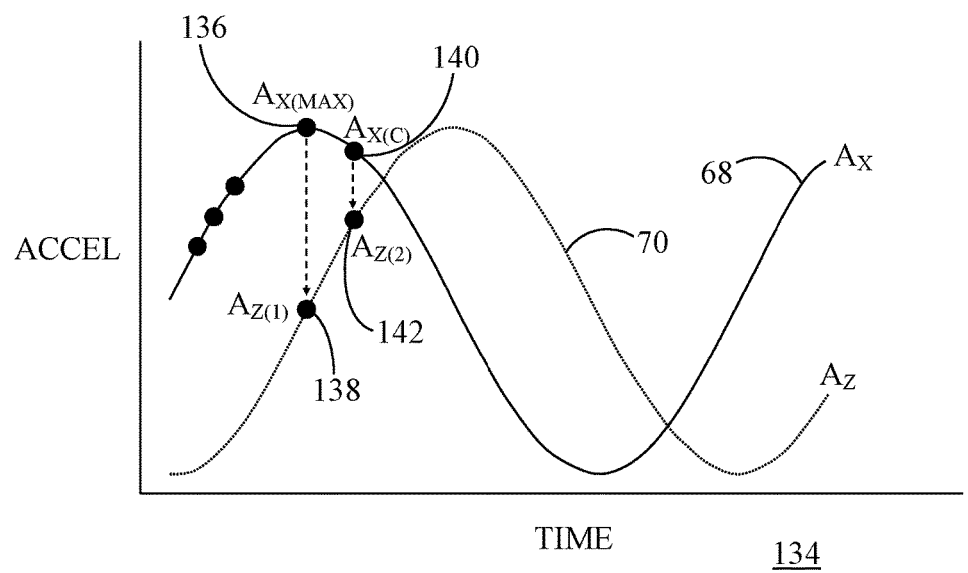
FIG. 6 shows a graph exemplifying clockwise rotation direction determination in accordance with the subprocess of FIG. 5.

Referring now to FIG. 6 in connection with FIG. 5, FIG. 6 shows a graph 134 exemplifying clockwise rotation direction determination in accordance with the subprocess of FIG. 5. In particular, graph 134 shows tangential acceleration signal 68 (solid line) and normalized radial acceleration signal 70 (dotted line) superimposed with tangential acceleration signal 68. The amplitude of each of tangential acceleration signal 68 and radial acceleration signal 70 oscillates in a sinusoidal manner in response to the rotation of the wheel 84 (FIG. 3).

FIG. 6 depicts the detection of a maximum tangential acceleration signal 136, $A_{X(MAX)}$, in accordance with block 118 of rotation direction determination subprocess 112. FIG. 6 further depicts the determination of a first radial acceleration signal 138, $A_{Z(1)}$, at the same instant as the detected maximum tangential acceleration signal 136 in accordance with block 120, the detection of a change in tangential acceleration signal 140, $A_{X(C)}$, in accordance with block 122, and the subsequent determination of a second radial acceleration signal 142, $A_{Z(2)}$ at the same instant as the detected change in tangential acceleration signal in accordance with block 124. In the example shown in FIG. 6, the radial acceleration difference, $A_{Z(DIFF)}$, is greater than zero since second radial acceleration signal 142 is greater than first radial acceleration signal 138. Accordingly, the rotation direction is clockwise.

Figure 7:
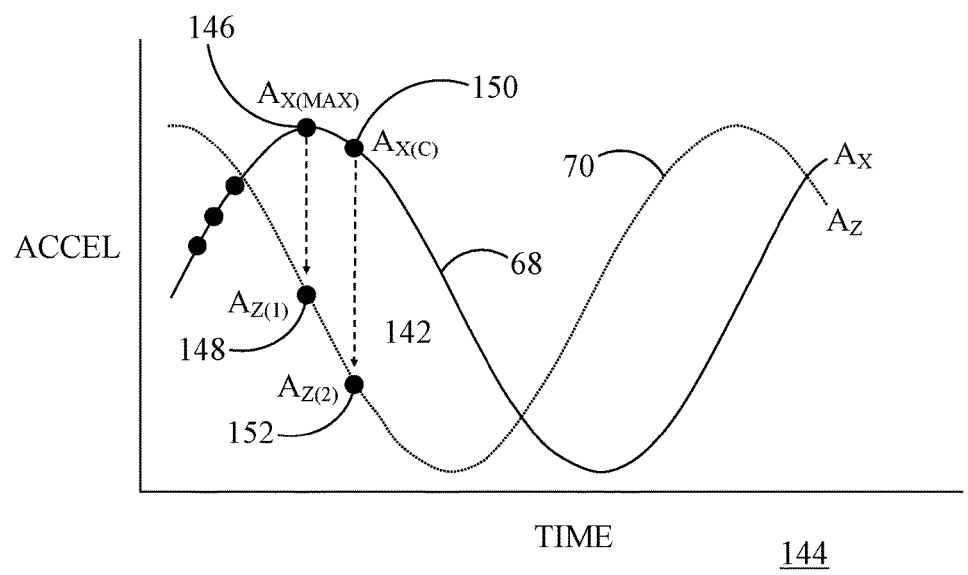
FIG. 7 shows a graph exemplifying counterclockwise rotation direction determination in accordance with the subprocess of FIG. 5.

Referring now to FIG. 7 in connection with FIG. 5, FIG. 7 shows a graph 144 exemplifying counterclockwise rotation direction determination in accordance with the subprocess of FIG. 5. In particular, graph 144 shows tangential acceleration signal 68 (solid line) and radial acceleration signal 70 (dotted line) superimposed with tangential acceleration signal 68. The amplitude of each of tangential acceleration signal 68 and radial acceleration signal 70 oscillates in a sinusoidal manner in response to the rotation of the wheel 84 (FIG. 3).

FIG. 7 depicts the detection of a maximum tangential acceleration signal 146, $A_{X(MAX)}$, in accordance with block 118 of rotation direction determination subprocess 112. FIG. 7 further depicts the determination of a first radial acceleration signal 148, $A_{Z(1)}$, at the same instant as the detected maximum tangential acceleration signal 146 in accordance with block 120, the detection of a change in tangential acceleration signal 150, $A_{X(C)}$, in accordance with block 122, and the subsequent determination of a second radial acceleration signal 152, $A_{Z(2)}$ at the same instant as the detected change in tangential acceleration signal in accordance with block 124. In the example shown in FIG. 7, the radial acceleration difference, $A_{z(DIFF)}$, is less than zero since second radial acceleration signal 152 is less than first radial acceleration signal 148. Accordingly, the rotation direction is counterclockwise. Thus, through execution of rotation direction determination subprocess 112, each TPMS module 22 and commensurately, the associated wheel 84 (FIG. 3), can determine its own rotation direction which can simply be sent from TPMS module 22 to receiver unit 24 as rotation direction data 78 (FIG. 2) in one or more data packets 28 (FIG. 2).

Figure 8:
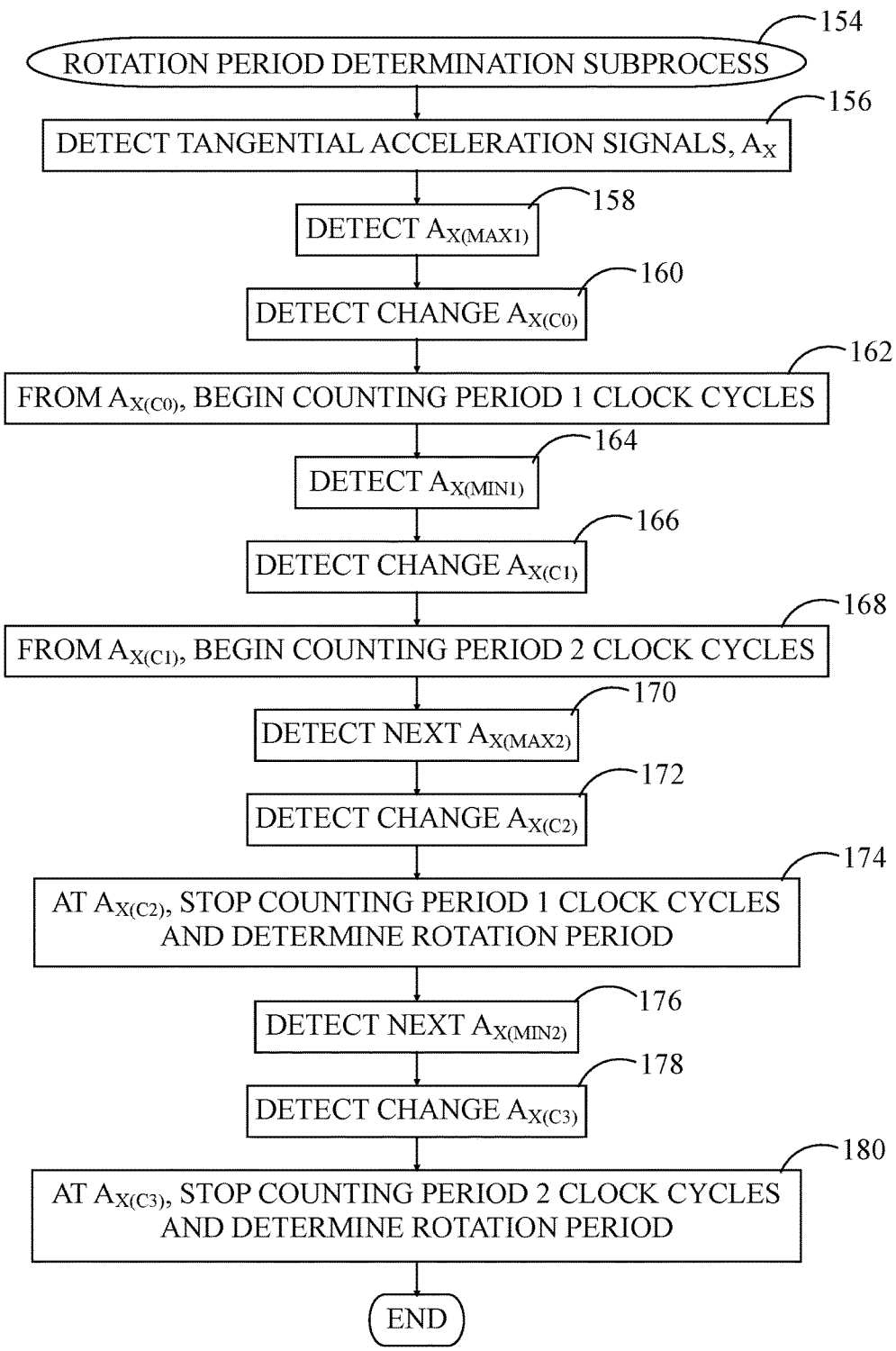
FIG. 8 shows flowchart of a rotation period determination subprocess of the TPMS data acquisition control process.

FIG. 8 shows flowchart of a rotation period determination subprocess 154 of TPMS data acquisition control process 92 (FIG. 4). In an example, rotation period determination subprocess 154 details the operations performed through the execution of rotation period determination algorithm 76 (FIG. 2) by each MCU 56 of each TPMS module 22. In particular, rotation period determination subprocess 154 is performed during the execution of TPMS data acquisition control process 92 to determine the rotation period of its associated wheel 84 (FIG. 3) utilizing, in this embodiment, tangential acceleration signal 68 (FIG. 2). Alternative embodiments may utilize radial acceleration signal 70 (FIG. 2) in lieu of tangential acceleration signal 68.

When a vehicle is turning, the steered wheels follow a longer path than the non-steered wheels. That is, in all vehicle configurations (rear wheel drive, front wheel drive, all-wheel drive, and so forth) the steered wheels take a wider arc during turns than the non-steered wheels. Since all wheels are affixed to the common vehicle chassis, the steered wheels are forced to rotate with shorter rotation periods than the non-steered wheels, regardless of the direction of motion of the vehicle (e.g., forward or reverse). The shorter rotation periods result in a faster rotation rate of the steered wheels relative to the rotation rate of the non-steered wheels. Accordingly, execution of rotation period determination subprocess 154 can distinguish the steered wheels (e.g., front) from the non-steered wheels (e.g., rear).

At a block 156, tangential acceleration signals 68, $A_x$, are detected at acceleration sensor 52. At a block 158, the detected tangential acceleration signals 68 are searched to find a first maximum tangential acceleration signal, $A_{X(MAX)}$. By way of example, the first maximum tangential acceleration signal, $A_{X(MAX1)}$, may be approximately the gravity of earth, e.g., 1 g. At a block 160, a change in tangential acceleration signal, $A_{X(C0)}$, is detected. For example, the change in tangential acceleration signal, $A_{X(C0)}$, may be less than 1 g, but greater than 0 g. At a block 162, system processes begin counting Period 1 clock cycles at the instant of detection of the change in tangential acceleration signal, $A_{X(C0)}$.

Next at a block 164, the detected tangential acceleration signals 68 are searched to find a first minimum tangential acceleration signal, $A_{X(MIN1)}$. By way of example, the first minimum tangential acceleration signal, $A_{X(MIN1)}$, may be approximately a negative of the gravity of earth, i.e., −1 g. At a block 166, a change in tangential acceleration signal, $A_{X(C1)}$, is detected. For example, the change in tangential acceleration signal, $A_{X(C0)}$, may be greater than −1 g, but less than 0 g. At a block 168, system processes begin counting Period 2 clock cycles at the instant of detection of the change in tangential acceleration signal, $A_{X(C1)}$.

Process operations continue with a block 170. At block 170, the detected tangential acceleration signals 68 are searched to find the next, referred to herein as a second, maximum tangential acceleration signal, $A_{X(MAX2)}$. Again, the second maximum tangential acceleration signal, $A_{X(MAX2)}$, may be approximately 1 g. At a block 172, a change in tangential acceleration signal, $A_{X(C2)}$, is detected. Again, the change in tangential acceleration signal, $A_{X(C2)}$, may be less than 1 g, but greater than 0 g. At a block 174, system processes stop counting Period 1 clock cycles at the instant of detection of the change in tangential acceleration signal, $A_{X(C2)}$, and rotation period is determined from the quantity of Period 1 clock cycles.

Next at a block 176, the detected tangential acceleration signals 68 are searched to find the next, referred to herein as a second minimum tangential acceleration signal, $A_{X(MIN2)}$. Again, the second minimum tangential acceleration signal, $A_{X(MIN2)}$, may be approximately negative 1 g. At a block 178, a change in tangential acceleration signal, $A_{X(C3)}$, is detected. Again, the change in tangential acceleration signal, $A_{X(C3)}$, may be greater than −1 g, but less than 0 g. At a block 180, system processes stop counting Period 2 clock cycles at the instant of detection of the change in tangential acceleration signal, $A_{X(C3)}$, and rotation period is determined from the quantity of Period 2 clock cycles. Thereafter, rotation period determination subprocess 154 ends.

Figure 9:
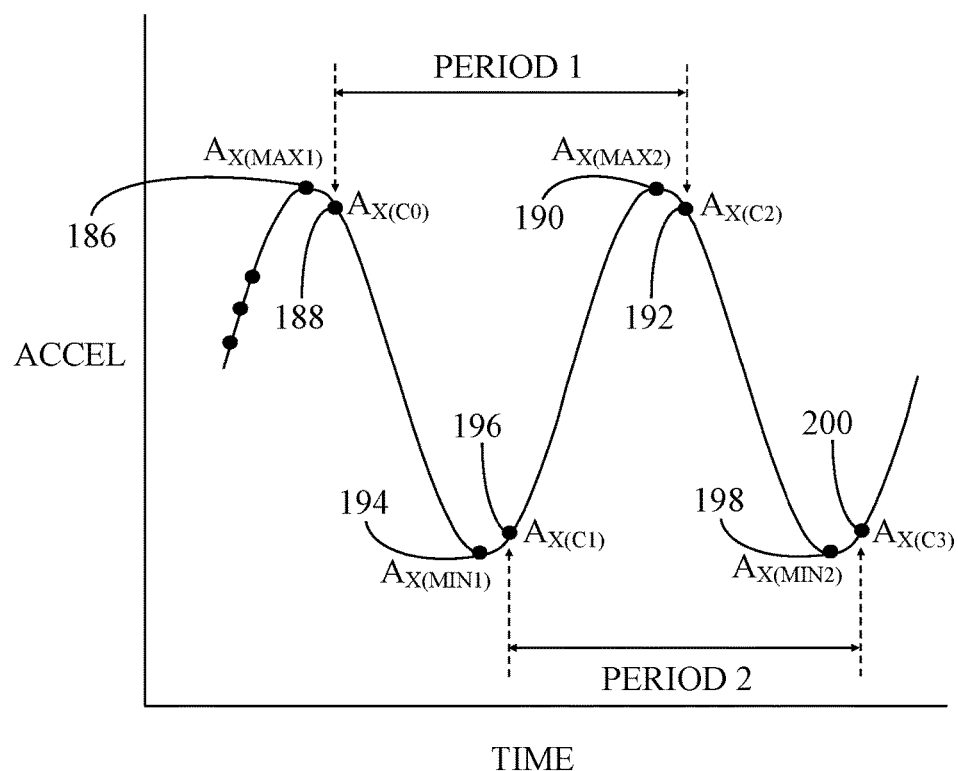
FIG. 9 shows a graph exemplifying rotation period determination in accordance with the subprocess of FIG. 8.

As mentioned in connection with block 174, rotation period can be determined from the quantity of Period 1 clock cycles. Further, as mentioned in connection with block 180, rotation period can also be determined at a different time from the quantity of Period 2 clock cycles. In an example, the quantity of clock cycles represents the rotation period. Thus, the rotation period may be estimated by counting the number of clock cycles. As the rotation period changes, the number of clock cycles per rotation period changes. The faster the rotation of the wheel (i.e., the faster the vehicle speed), the fewer clock cycles, and therefore a shorter rotation period. In some embodiments, the quantity of each of Period 1 and Period 2 clock cycles may simply be transmitted to receiver unit 24. In other embodiments, the quantity of clock cycles for more than two periods may be transmitted to receiver unit 24. In still other embodiments, an average of the Period 1 and Period 2 clock cycles may be computed to determine a representation of the rotation period. In other schemes, TPMS module 22 may have a real-time clock available and the units of time, i.e., the rotation period, can be a direct measurement. Following block 182, Now referring to FIG. 9 in connection with FIG. 8, FIG. 9 FIG. 9 shows a graph 184 exemplifying rotation period determination in accordance with rotation period determination subprocess 154 (FIG. 8). In particular, graph 184 shows, in an example embodiment, tangential acceleration signal 68 oscillating in a sinusoidal manner in response to the rotation of the wheel 84 (FIG. 3). Although as mentioned above, this could be radial acceleration signal 70 (FIG. 2) or any other sinusoidal reaction to the movement of wheels 84.

Regarding the determination of Period 1 clock cycles, FIG. 9 depicts the detection of a first maximum tangential acceleration signal 186, $A_{X(MAX1)}$, in accordance with block 158 of rotation period determination subprocess 154. FIG. 9 further depicts the detection of a change in tangential acceleration signal 188, $A_{X(C0)}$, in accordance with block 160, the subsequent counting of Period 1 clock cycles in accordance with block 162, the detection of a second maximum tangential acceleration signal 190, $A_{X(MAX2)}$, in accordance with block 170, the detection of the change in tangential acceleration signal 192, $A_{X(C2)}$ in accordance with block 172, and the subsequent stop in the count of Period 1 clock cycles in accordance with block 174.

Similarly regarding the determination of Period 2 clock cycles, FIG. 9 depicts the detection of a first minimum tangential acceleration signal 194, $A_{X(MIN1)}$, in accordance with block 164 of rotation period determination subprocess 154. FIG. 9 further depicts the detection of a change in tangential acceleration signal 196, $A_{X(C1)}$, in accordance with block 166, the subsequent counting of Period 2 clock cycles in accordance with block 168, the detection of a second minimum tangential acceleration signal 198, $A_{X(MIN2)}$, in accordance with block 176, and the detection of the change in tangential acceleration signal 200, $A_{X(C3)}$ in accordance with block 178, and the subsequent stop in the count of Period 2 clock cycles at block 180.

At very low vehicle speeds, i.e., very long rotation periods, the time between RF transmissions of data packets 28 can be long. Accordingly, in this example, the rotation period is calculated two times (e.g., Period 1 clock cycles and Period 2 clock cycles) to provide receiver unit 24 (FIG. 1) with additional opportunities to complete wheel position assignment. As the vehicle speed increases, a single calculation and transmission of rotation period can be performed.

Figure 10:
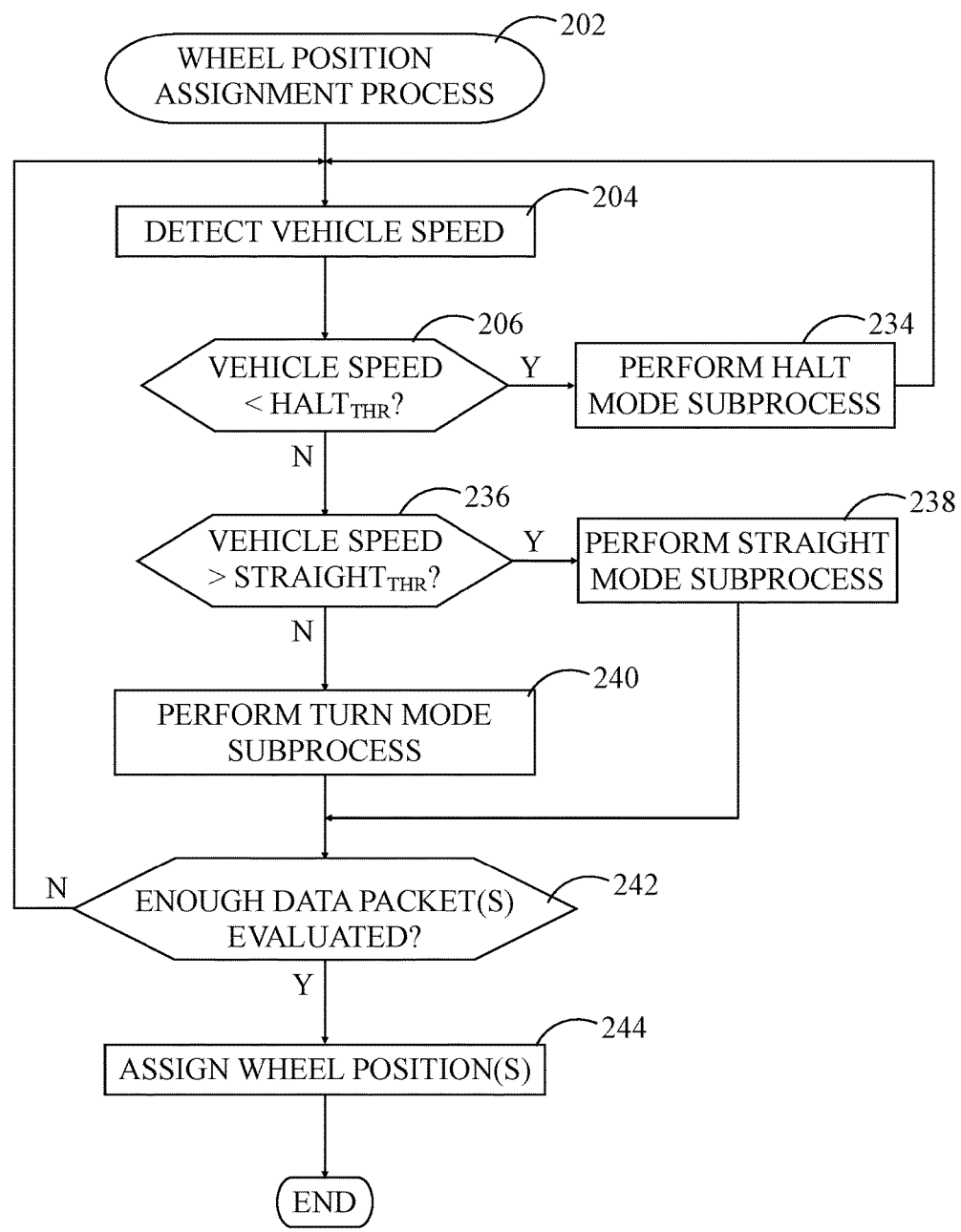
FIG. 10 shows a flowchart of wheel position assignment process in accordance with an embodiment.

FIG. 10 shows a flowchart of wheel position assignment process 202 in accordance with an embodiment. In an example, wheel position assignment process 202 details the operations performed through the execution of wheel position assignment algorithm 46 (FIG. 1) by each MCU 34 of receiver unit 24. The following methodology will be described in connection with wheel position assignment of a vehicle having four wheels. It should be understood, however, that the ensuing methodology may be readily adapted for performing wheel position assignment on a vehicle having more than four wheels.

As described in detail above, each of TPMS modules 22 (FIG. 2) is capable of determining the rotation direction (clockwise or counterclockwise) of its associated wheel 84 (FIG. 3). Additionally, each TPMS module 22 is capable of determining the rotation period (in which example, the number of clock cycles per rotation period) of its associated wheel 84. Rotation direction data 78 (FIG. 2) and rotation period data 80 (FIG. 2) is thereafter transmitted within data packets 28 (FIG. 1) to receiver unit 24 (FIG. 1). Advantageously, receiver unit 24 simply determines the direction of movement of vehicle 82 (FIG. 3), and utilizes its knowledge of the direction of movement vehicle 82, as well as, unique identifier 26 (FIG. 1), rotation direction data 78 and rotation period data 80 from each of TPMS modules 22 to enable the assignment of wheels 84 to particular positions (e.g., front-right, back-right, front-left, back-left) on vehicle 82.

Prior art methodology typically entails calculation of at least the rotation period in the in-vehicle receiver unit. This rotation period is estimated based upon the timestamp of the in-bound RF frame from the TPMS sensor module. Many sources of error require that the RF transmissions and subsequent calculations be repeated and averaged over a long time period, consuming significant power in both the TPMS sensor module and the RF receiver unit. The execution of TPMS data acquisition control process 92 (FIG. 4) at TPMS modules 22, transmission of the results to receiver unit 24, and subsequent execution of wheel position assignment process 202 at receiver unit 24 is quick and efficient, relative to prior art methodologies, and consumes minimal power since timestamping and averaging processes are not required. Thus, receiver unit 24 receives clean results from TPMS modules 22 infrequently and therefore is not required to perform averaging to obtain a single useful sample.

At a block 204 of wheel position assignment process 202, receiver unit 24 detects the current speed of vehicle 82 (FIG. 3). The current speed of vehicle 82 may be detected by locally attached sensors, such as vehicle motion sensors 38 (FIG. 1), or any other suitable means. At a query block 206, a determination is made as to whether the detected vehicle speed is less than a halt threshold value, $HALT_{THR}$. A vehicle speed of less than a halt threshold value may indicate that the vehicle is not moving, or not moving fast enough to yield viable data.

Figure 11:
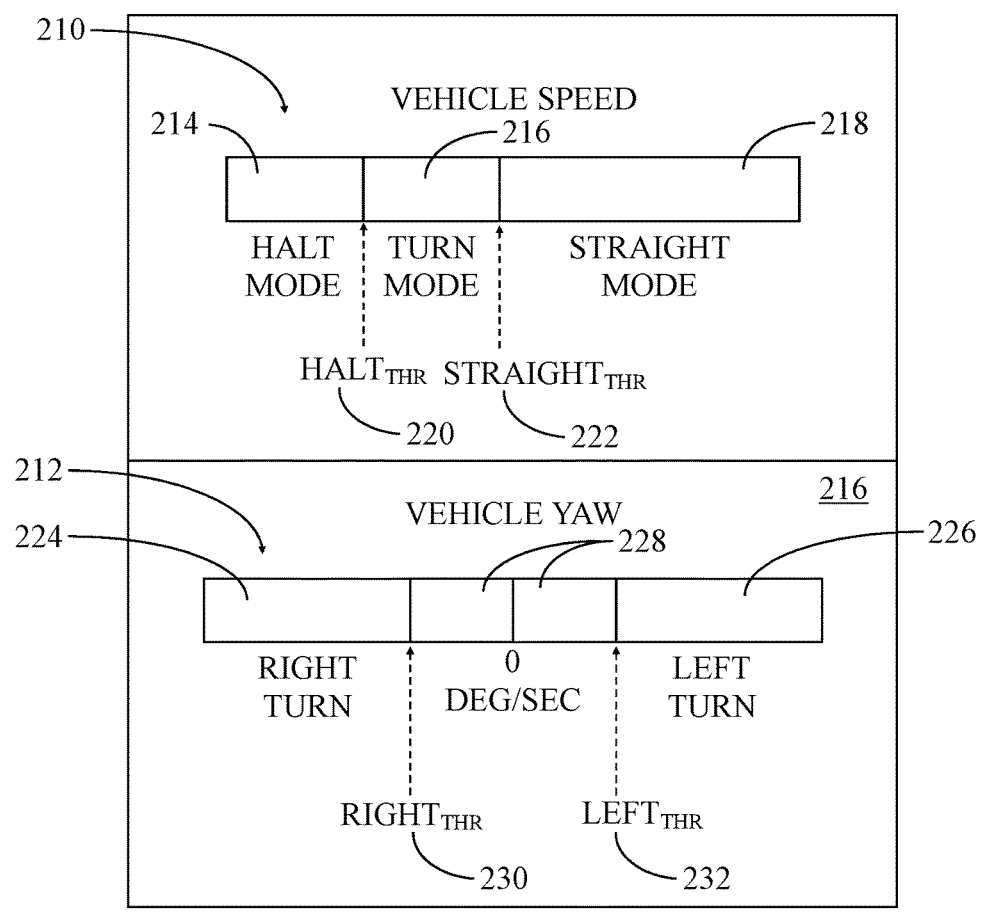
FIG. 11 shows a state chart of vehicle speed modes and vehicle turn modes utilized in connection with the wheel position assignment process of FIG. 10.

Referring to FIG. 11 in connection with query block 206, FIG. 11 shows a state chart 208 of vehicle speed modes 210 and vehicle turn modes 212 utilized in connection with wheel position assignment process 202. Vehicle speed modes 210 can include a halt mode 214, a turn mode 216 in which the vehicle is making right or left turn, and a straight mode 218 in which the vehicle is moving in a generally straight forward direction. A halt threshold value 220, $HALT_{THR}$, denotes a boundary between halt mode 214 and turn mode 216. Similarly, a straight threshold value 222, $STRAIGHT_{THR}$, denotes a boundary between turn mode 216 and straight mode 218. At higher speeds, vehicle turns become more gradual, eventually approximating straight line motion with little rotation rate difference being generated during the turn. Thus, turning at higher speeds may not generate enough difference in rotation period data 80 to be useful. Accordingly, rotation period determination algorithms may be designed to operate at only low vehicular speeds, where the probability of the vehicle turning is the highest, and the difference in rotation period is also the highest.

In general, detection of a particular vehicle speed mode, e.g., halt mode 214, turn mode 216, and/or straight mode 218, determines which localization subprocesses receiver unit 24 may or may not perform in order to at least partially determine the location of TPMS modules 22, and by association to determine the positions of wheels 84 (FIG. 3) on vehicle 82. It should be observed, that the range of vehicular speeds for turn mode 216 is less than the range of vehicular speeds for straight mode 218. The range of vehicular speeds for turn mode 216 corresponds to the conventional driving technique of slowing the vehicle down to make a turn.

Vehicle turn modes 212 can include a right turn mode 224, a left turn mode 226, and an intermediate mode 228. Intermediate mode 228 indicates a range of turn motion (e.g., in degrees per second) that may not be sufficiently large to differentiate the rotation periods of the wheels. For example, intermediate mode 228 may occur when a vehicle is moving on a winding road in which the turning radius can be very large. A right turn threshold 230, $RIGHT_{THR}$, denotes a boundary between intermediate mode 228 and right turn mode 224, where a turning radius to the left of right turn threshold 230 is small enough to differentiate the rotation periods of the wheels. Similarly, a left turn threshold 232, $LEFT_{THR}$, denotes a boundary between intermediate mode 228 and left turn mode 226, where a turning radius to the right of left turn threshold 232 is small enough to differentiate the rotation periods of the wheels.

Figure 12:
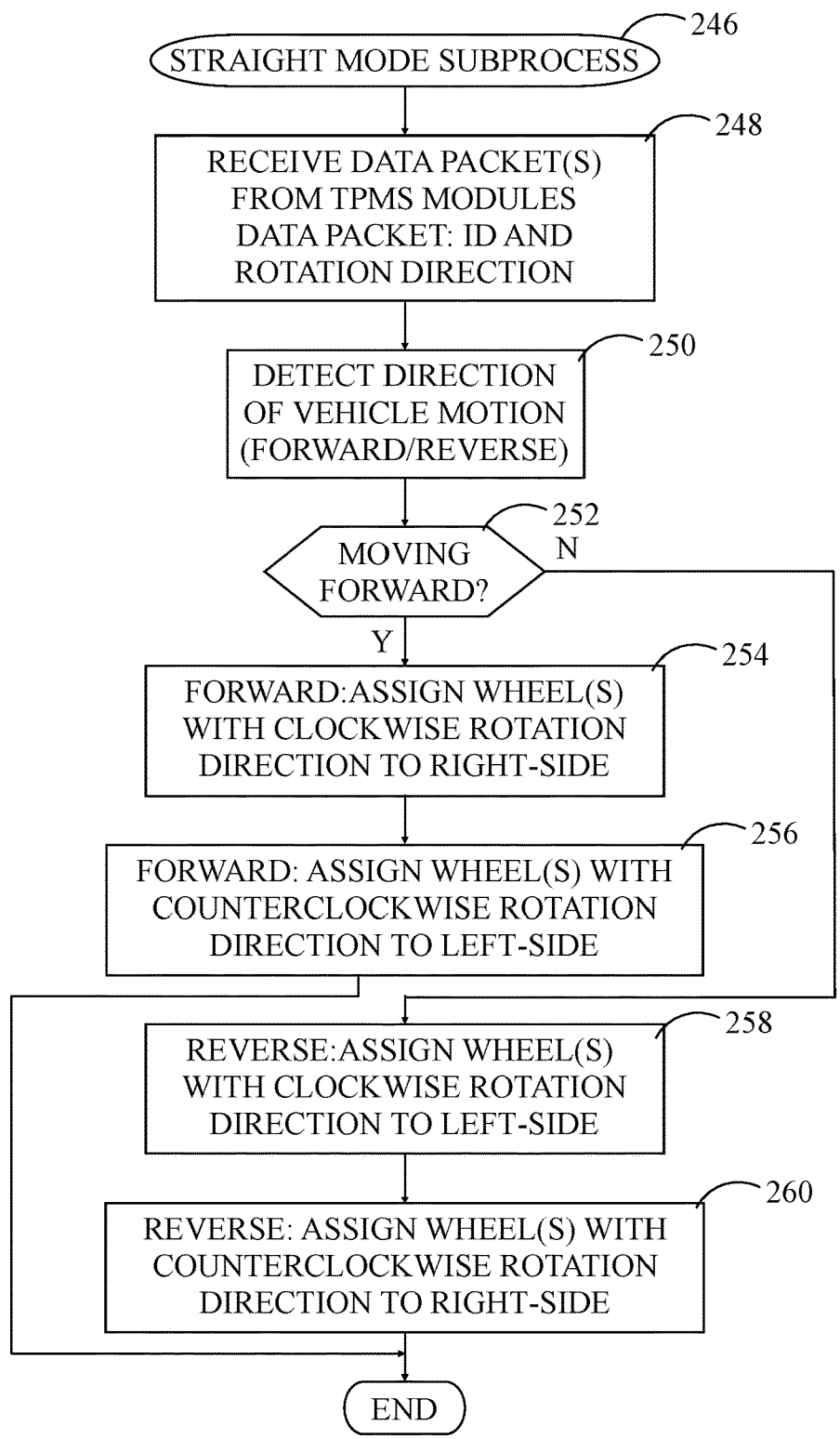
FIG. 12 shows a flowchart of a straight mode subprocess of the wheel position assignment process of FIG. 10.
Figure 13:
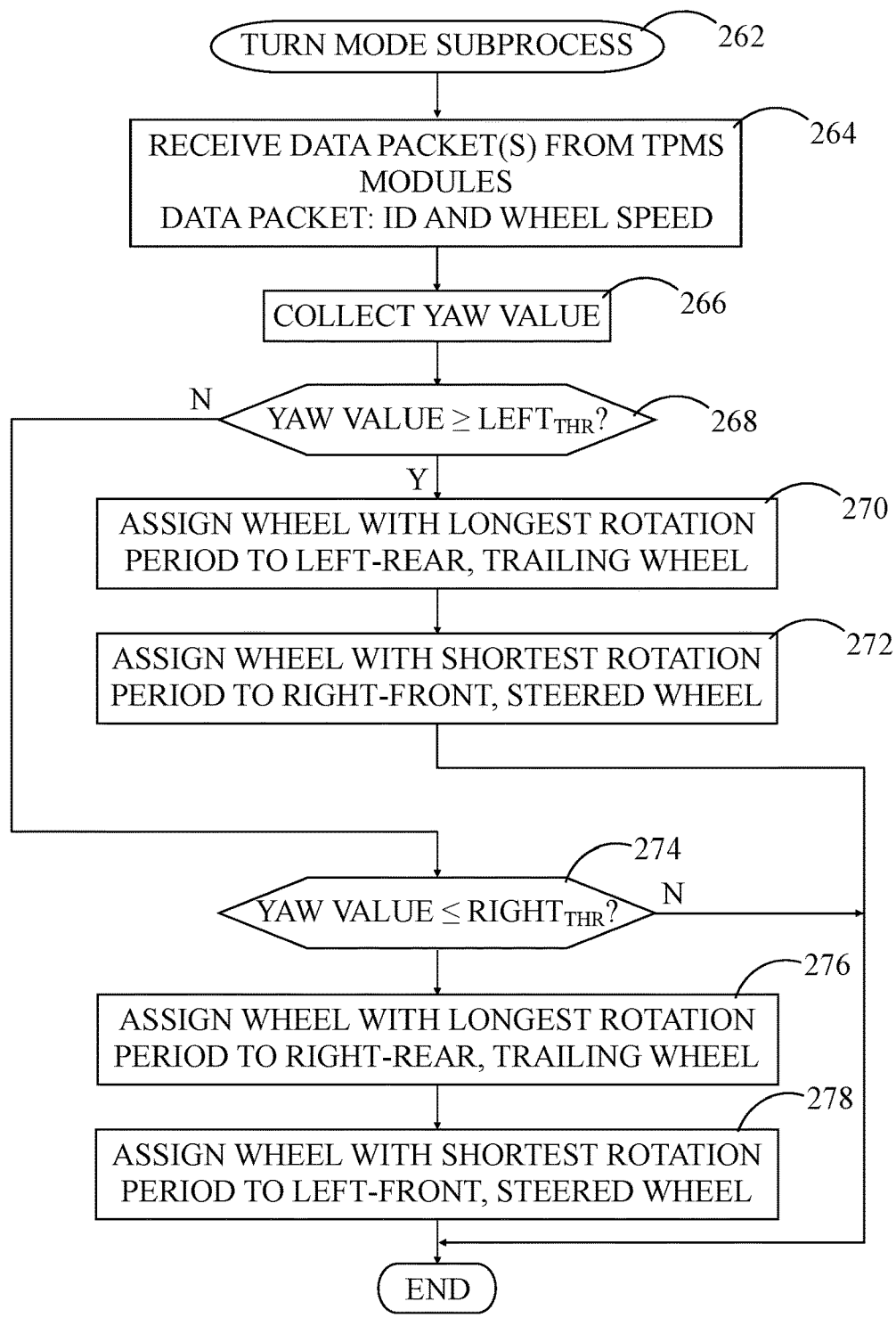
FIG. 13 shows a flowchart of a turn mode subprocess of the wheel position assignment process of FIG. 10.

Continued reference should be made to state chart 208 of FIG. 11 in connection with the ensuing description of wheel position assignment process 202 of FIG. 10 and its subprocesses of FIGS. 12 and 13.

Now referring back to wheel position assignment process 202 of FIG. 10, when a determination is made at query block 206 that the vehicle is in halt mode 214, a block 234 may be performed. At block 234, a halt mode subprocess may be performed at receiver unit 24. A halt mode subprocess is not described in detail for brevity since such operations do not pertain to wheel position assignment. However, it should be understood that a halt mode subprocess may entail continuing to check for vehicle motion, supporting control processes, and the like. Accordingly, in response to block 234, process control loops back to block 204 to detect vehicular speed.

When a determination is made at query block 206 that the vehicular speed is not less than halt threshold value 220, a query block 236 assesses whether the vehicle speed is greater than straight threshold value 222. When a determination is made at query block 236 that the vehicle speed exceeds straight threshold value 222, a block 238 is performed to execute a straight mode subprocess. The straight mode subprocess is performed to determine the rotation direction of each of the TPMS modules (FIG. 2), and therefore the rotation direction of each of the associated wheels 84. The details of a straight mode subprocess are described below in connection with FIG. 12.

When a determination is made at query block 236 that the vehicle speed is less than straight threshold value 222, a block 240 is performed to execute a turn mode subprocess. The turn mode subprocess is performed to determine the rotation period of each of the TPMS modules (FIG. 2), and therefore the rotation period of each of the associated wheels 84. The details of a turn mode subprocess are described below in connection with FIG. 13.

Following either of the execution of a straight mode subprocess at block 238 or the execution of a turn mode subprocess at block 240, wheel position assignment process 202 may continue with a query block 242. At query block 242, receiver unit 24 determines whether enough information, e.g., data packets 28 containing rotation direction data 78 and rotation period data 80, have been evaluated in order to assign wheel positions on the vehicle. When a determination is made at query block 242, process control may loop back to block 204 to continue detecting vehicular speed and to continue the execution of the straight mode subprocess and/or the turn mode subprocess.

However, when a determination is made at query block 242 that enough data packet(s) 28 have been evaluated, process 202 continues with a block 244. At block 244, receiver unit 24 assigns the position of each wheel 84 (FIG. 3) on vehicle 82 (FIG. 3) based on the unique identifier 26 (FIG. 2) of each TPMS module 22, rotation direction data 78 computed at each TPMS module 22, and rotation period data 80 computed at each TPMS module 22. Thereafter, wheel position assignment process 202 ends.

Accordingly, a wheel position assignment mode (e.g., process 202) is entered by receiver unit 24 through the determination that the vehicle is moving at a speed sufficient to perform wheel position assignment. The wheel position assignment mode is implemented to evaluate rotation direction and rotation period (e.g., wheel speed) estimated and transmitted by TPMS modules 22. These data packet(s) 28 containing unique identifier 26, rotation direction data 78, and rotation period data 80. Data packet(s) can also contain pressure, cyclic redundancy check (CRC) data, and so forth.

In some schemes, TPMS modules 22 may remain in the data collection mode based on periodic samples of radial acceleration signal 70 (FIG. 2). For example, fully compensated values of radial acceleration signal 70 may be compared to upper and lower fixed thresholds (e.g., between +3 g and +100 g or between −3 g and −100 g). If the value of radial acceleration signal 70 is between either of these thresholds and a defined quantity of data packets 28 has not yet been transmitted, TPMS modules 22 may continue the process of determining the rotation direction and rotation period. As these values are recalculated, each TPMS module 22 can trigger the output of an additional data packet 28 containing unique identifier 26, rotation direction, rotation period, and so forth. When the radial acceleration signal 70 is beyond the maximum threshold values (e.g., +100 g or −100 g), TPMS modules 22 may only transmit the pressure signal.

As mentioned above, receiver unit 24 may transition between three primary states. These three primary states include halt mode 214, turn mode 216 to determine the rotation period, and straight mode 218 to determine rotation direction. Typically, vehicles will experience slow speed maneuvering at the beginning of a driving cycle (for example, while driving from a parking spot to the highway). An objective of the various embodiments is to complete the wheel position assignments during the first few seconds of such maneuvering. Thus, rotation direction can be collected in straight mode 218 and the rotation period can be collected in turn mode 216 at the beginning of each new driving cycle, i.e., during the first few second of driving. Accordingly, data collection and auto-location (i.e., wheel assignment) may be accomplished in the first few rotations of the wheels (i.e., during the first few seconds of driving), during a time when there is higher potential for a variety of vehicle driving patterns, and therefore avoid a large consumption of time and/or battery power.

Referring now to FIG. 12, FIG. 12 shows a flowchart of a straight mode subprocess 246 of wheel position assignment process 202 (FIG. 10). Straight mode subprocess 246 is performed in accordance with block 238 (FIG. 10) of wheel position assignment process 202 to evaluate the rotation direction of each TPMS module 22, and hence partially localize each wheel 84 on vehicle 82 (FIG. 3).

At a block 248, data packet(s) 28 (FIG. 2) are received from each TPMS module 22. Each of data packets 28 includes a particular unique identifier 26 (FIG. 2) and rotation direction data 78. Of course, as discussed above, each of data packets 28 may also include rotation period data 80 (FIG. 2), pressure, CRC data, and the like.

At a block 250, receiver unit 24 determines the current direction of vehicular motion (either forward or reverse). Determining the direction of vehicular motion can be accomplished by, for example, using locally attached vehicle motion sensors 38 (FIG. 1), such as accelerometers and/or gyroscopes. Alternatively, some vehicles can eavesdrop on the vehicle network where, for example, the transmission electronic control unit (ECU) sends gear direction. And still alternatively, some vehicles can eavesdrop on the vehicle network where, for example, the navigation system ECU sends a global positioning system (GPS) derived heading. Other techniques may be implemented to determine the direction of vehicular motion.

At a query block 252, a determination is made as to whether vehicle 82 (FIG. 3) is moving forward. When vehicle 82 is moving forward, at a block 254, receiver unit 24 evaluates data packets 28 and assigns one or more wheels 84 exhibiting a clockwise rotation direction to be right-side wheels 84 of vehicle 82. Correspondingly, at a block 256, receiver unit 24 evaluates data packets 28 and assigns one or more wheels 84 exhibiting a counterclockwise rotation direction to be left-side wheels 84 of vehicle 82 when vehicle 82 is moving forward. Thereafter, straight mode subprocess 246 ends.

However, at query block 252, when a determination is made that vehicle 82 is moving in reverse, process control proceeds to a block 258. At block 258, receiver unit 24 evaluates data packets 28 and assigns one or more wheels 84 exhibiting a clockwise rotation direction to be left-side wheels 84 of vehicle 82. Correspondingly, at a block 260, receiver unit 24 evaluates data packets 28 and assigns one or more wheels 84 exhibiting a counterclockwise rotation direction to be right-side wheels 84 of vehicle 82 when vehicle 82 is moving in reverse. Thereafter, straight mode subprocess 246 ends.

Referring now to FIG. 13 and with continued reference to state graph 208 of FIG. 11, FIG. 13 shows a flowchart of a turn mode subprocess 262 of wheel position assignment process 202 (FIG. 10). Turn mode subprocess 262 is performed in accordance with block 240 (FIG. 10) of wheel position assignment process 202 to evaluate the rotation period of each TPMS module 22, and hence partially localize each wheel 84 on vehicle 82 (FIG. 3). In this example description of FIG. 13, it has been determined that vehicle 82 is moving in a forward direction (for example, at block 252 of straight mode subprocess 246, FIG. 12). It should be understood, however, that the ensuing methodology can be readily adapted to account for reverse direction vehicular motion (discussed below).

At a block 264, data packet(s) 28 (FIG. 2) are received from each TPMS module 22. Each of data packets 28 includes a particular unique identifier 26 (FIG. 2) and rotation period data 80. Of course, as discussed above, each of data packets 28 may also include rotation direction data 78 (FIG. 2), pressure, CRC data, and the like. At a block 266, receiver unit 24 collects a yaw value of vehicular motion. The yaw value (rightward or leftward turn motion) can be accomplished by, for example, using locally attached vehicle motion sensors 38 (FIG. 1), such as accelerometers, gyroscopes, and/or steering wheel positions, by eavesdropping on the vehicle network, and so forth.

At a query block 268, receiver unit 24 determines whether the collected yaw value exceeds left turn threshold 232, $LEFT_{THR}$. When a determination is made that the collected yaw value exceeds left turn threshold 232, thereby indicating that vehicle 82 is making a left turn, process control continues with a block 270. At a block 270, receiver unit 24 evaluates data packets 28 and assigns one of wheels 84 exhibiting the longest rotation period (i.e., the greatest number of clock cycles, and therefore the slowest rotation speed) to be left-rear, non-steered wheel. Correspondingly, at a block 272, receiver unit 24 evaluates data packets 28 and assigns one of wheels 84 exhibiting the shortest rotation period (i.e., the least number of clock cycles, and therefore the fastest rotation speed) to be right-front, steered wheel. Thereafter, turn mode subprocess 262 ends.

However, at query block 268, when a determination is made that the collected yaw value does not exceed left turn threshold, process control continues with a query block 274. At query block 274, receiver unit 24 determines whether the collected yaw value is less than right turn threshold 230, $RIGHT_{THR}$. When a determination is made that the collected yaw value is less than right turn threshold 230, thereby indicating that vehicle 82 is making a right turn, process control continues with a block 276. At a block 276, receiver unit 24 evaluates data packets 28 and assigns one of wheels 84 exhibiting the longest rotation period (i.e., the greatest number of clock cycles, and therefore the slowest rotation speed) to be right-rear, non-steered wheel. Correspondingly, at a block 278, receiver unit 24 evaluates data packets 28 and assigns one of wheels 84 exhibiting the shortest rotation period (i.e., the least number of clock cycles, and therefore the fastest rotation speed) to be left-front, steered wheel. Thereafter, turn mode subprocess 262 ends.

It should be further observed that when a determination is made at query block 274 that the collected yaw value is greater than right turn threshold 230, but is also less than left turn threshold 232 as determined in query block 268, then turn mode subprocess 262 also ends. That is, the collected yaw value falls somewhere within intermediate mode 228. Therefore, the turn radius of vehicle 82 (FIG. 2) will be too large to accurately distinguish the various rotation periods.

Again, turn mode subprocess 262 is described in connection with forward motion of vehicle 82. In order to adapt the methodology to account for reverse direction vehicular motion, the signs for the left and right threshold values in the query blocks above would be reversed. That is, at query block 268, a determination would be made as to whether the collected yaw value is less than or equal to left turn threshold 232, $LEFT_{THR}$. Similarly, at query block 274, a determination would be made as to whether the collected yaw value is greater than or equal to turn threshold 230, $RIGHT_{THR}$.

Although turn mode subprocess 262 is deemed a partial localization process, turn mode subprocess 262 may be adapted to perform complete localization of TPMS modules 22, and hence the positions of wheels 84, without knowledge of clockwise and counterclockwise rotation direction of wheels 84. For example, rotation periods associated with left turn data may be utilized to identify the left-rear non-steered wheel and the right-front steered wheel. Additionally, rotation periods associated with right turn data may be utilized identify the right-rear non-steered wheel and the left-front steered wheel. Accordingly, although it may be possible to perform wheel position assignment utilizing only rotation period data 80 (FIG. 2) and knowledge of right/left turns, evaluation of rotation direction data 78 (FIG. 2) enables the wheel assignment (auto-location) to be completed quicker, thereby saving power.

Figure 14:
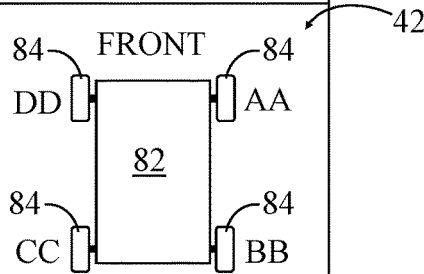
FIG. 14 shows a chart of an example outcome of the execution of the wheel position assignment process of FIG. 10.

FIG. 14 shows a chart 280 of an example outcome of the execution of the wheel position assignment process 202 (FIG. 10). More particularly, chart 280 shows an example outcome of a partial localization 282 of the positions of wheels 84 based on unique identifiers 26 of TPMS modules 22 and rotation direction 284 through the execution of straight mode subprocess 246 (FIG. 12). Chart 280 further shows an example outcome of a partial localization 286 of the positions of wheels 84 based on unique identifiers 26 of TPMS modules 22 and rotation period 288 through the execution of turn mode subprocess 262 (FIG. 13). Accordingly, wheel position assignments 290 can be made based on unique identifiers 26 and the two partial localizations 282, 286.

Regarding partial localization 282 based on rotation direction in this example, vehicle motion is determined to be forward motion. TPMS modules 22 having unique identifiers "A" and "B" determined that rotation direction 284 of their associated wheels 84 "AA" and "BB" is clockwise (CW). Thus, the partial localization 282 of wheels 84 "AA" and "BB" based on rotation direction 284 is the right-side of vehicle 82 from within vehicle 82 and facing forward. Conversely, TPMS modules 22 having unique identifiers "C" and "D" determined that rotation direction 284 of their associated wheels 84 "CC" and "DD" is counterclockwise (CCW). Thus, the partial localization 282 of wheels 84 "CC" and "DD" based on rotation direction 284 is the left-side of vehicle 82 from within vehicle 82 and facing forward.

Regarding partial localization 284 based on rotation period in this example, vehicle motion is determined to be a left turn. Evaluation of rotation periods 288 for each of TPMS modules 22 having unique identifiers "A," "B," "C," and "D" and their associated wheels 84 "AA," "BB," "CC," and "DD" reveals that TPMS module 22 "C" and its associated wheel 84 "CC" has the longest rotation period 288. Thus, wheel "CC" is the non-steered (rear) wheel. Conversely, TPMS module 22 "A" and its associated wheel 84 "AA" has the shortest rotation period 288. Thus, wheel "AA" is the steered (front) wheel.

The information gleaned from partial localizations 282, 286 yields wheel position assignments 290. In this example, wheel 84 "AA" is the front-right wheel, wheel 84 "BB" is the back-right wheel, wheel 84 "CC" is the back-left wheel, and wheel 84 "DD" is the front-left wheel. This information may be presented, for example, on display 42 in conjunction with an abnormal pressure signal 64 (FIG. 2).

FIG. 15 shows a chart 292 of another example outcome of the execution of wheel position assignment process 202 (FIG. 10). More particularly, chart 292 shows an example outcome of a partial localization 294 of the positions of wheels 84 based on unique identifiers 26 of TPMS modules 22 and rotation period 296 through the execution of turn mode subprocess 262 (FIG. 13). Chart 292 also shows an example outcome of a partial localization 298 of the positions of wheels 84 based on unique identifiers 26 of TPMS modules 22 and rotation period 296 again through the execution of turn mode subprocess 262 (FIG. 13). Accordingly, wheel position assignments 300 can be made based on unique identifiers 26 and the two partial localizations 294, 298, each of which is based on rotation period.

Regarding partial localization 294 based on rotation period in this example, vehicle motion is determined to be a left turn. Evaluation of rotation periods 296 for each of TPMS modules 22 having unique identifiers "A," "B," "C," and "D" and their associated wheels 84 "AA," "BB," "CC," and "DD" reveals that TPMS module 22 "C" and its associated wheel 84 "CC" has the longest rotation period 296. Thus, wheel "CC" is the non-steered (rear) left wheel. Conversely, TPMS module 22 "A" and its associated wheel 84 "AA" has the shortest rotation period 288. Thus, wheel "AA" is the steered (front) right wheel.

Regarding partial localization 298 based on rotation period in this example, vehicle motion is determined to be a right turn. Evaluation of rotation periods 296 for each of TPMS modules 22 having unique identifiers "A," "B," "C," and "D" and their associated wheels 84 "AA," "BB," "CC," and "DD" reveals that TPMS module 22 "B" and its associated wheel 84 "BB" has the longest rotation period 296. Thus, wheel "BB" is the non-steered (rear) right wheel. Conversely, TPMS module 22 "D" and its associated wheel 84 "DD" has the shortest rotation period 288. Thus, wheel "DD" is the steered (left) right wheel.

The information gleaned from partial localizations 294, 298 yields wheel position assignments 300. Again in this example, wheel 84 "AA" is the front-right wheel, wheel 84 "BB" is the back-right wheel, wheel 84 "CC" is the back-left wheel, and wheel 84 "DD" is the front-left wheel. This information may be presented, for example, on display 42 in conjunction with an abnormal pressure signal 64 (FIG. 2).

It is to be understood that certain ones of the process blocks depicted in FIGS. 4, 5, 8, 10, 12, and 13 may be performed in parallel with each other or with performing other processes. In addition, it is to be understood that the particular ordering of the process blocks depicted in FIGS. 4, 5, 8, 10, 12, and 13 may be modified, while achieving substantially the same result. Accordingly, such modifications are intended to be included within the scope of the inventive subject matter.

Thus, a system and methodology for determining vehicular wheel positions from tire pressure monitoring system signals are disclosed herein. An embodiment of a method comprises determining a rotation period of a wheel on a vehicle at a sensor module associated with the wheel, receiving at least one data packet at a receiver unit of the vehicle from the sensor module, the at least one data packet including the rotation period and a unique identifier for the sensor module, and utilizing, at the receiver unit, the rotation period and the unique identifier to ascertain a first partial localization of the wheel, the first partial localization being one of a steered wheel and a non-steered wheel.

An embodiment of a system comprises a plurality of sensor modules, each of the sensor modules being configured to determine a rotation period for an associated wheel of a plurality of wheels on a vehicle, and a receiver unit configured to receive data packets from the plurality of sensor modules, each of the data packets including the rotation period and a unique identifier for the sensor module associated with the associated wheel of the plurality of wheels, and the receiver unit being further configured to utilize the rotation period and the unique identifier within the data packets to ascertain a first partial localization of the associated wheel, the first partial localization being one of a steered wheel and a non-steered wheel.

Another embodiment of a method comprises determining a rotation period of a wheel on a vehicle at a sensor module associated with the wheel, determining a rotation direction of the wheel at the sensor module, and receiving at least one data packet at a receiver unit of the vehicle from the sensor module, the at least one data packet including a unique identifier for the sensor module, the rotation period, and the rotation direction, the at least one data packet including the rotation period determined while the vehicle is in a turn mode, the turn mode being one of a right turn and a left turn, and the at least one data packet including the rotation direction while the vehicle is in a non-turning mode. The method further comprises utilizing, at the receiver unit, the rotation period and the unique identifier to ascertain a first partial localization of the wheel, the first partial localization being one of a steered wheel and a non-steered wheel of the wheel, utilizing, at the receiver unit, the rotation direction and the unique identifier to determine a second partial localization of the wheel, the second partial localization being one of a first side of the vehicle and a second side of the vehicle, and assigning the wheel to a position on the vehicle based on the unique identifier for the sensor module and the first and second partial localizations.

Accordingly, the system and methodology enable calculation of rotation period and rotation direction of a vehicle at each tire pressure monitoring system (TPMS) module associated with each wheel. The rotation period and rotation direction are received a central receiver unit of the TPMS system. The receiver unit can readily determine which wheels are on the right side or left side of the vehicle based on rotation direction and which wheels are steered wheels and non-steered wheels based on the rotation period. Accordingly, the receiver unit can assign locations of the TPMS modules, and hence positions of the wheels of the vehicle, time efficiently and using minimal power due to eliminating the need for timestamping and averaging.

According to an example, a method to ascertain a first partial localization of one or more wheels of a vehicle is provided. A rotation period of a wheel on the vehicle is determined at a sensor module associated with the wheel. At least one data packet is received at a receiver unit of the vehicle from the sensor module. The at least one data packet includes the rotation period and a unique identifier for the sensor module. At the receiver unit, the rotation period and the unique identifier is utilized to ascertain a first partial localization of the wheel. The first partial localization is one of a steered wheel and a non-steered wheel.

According to an example, it is detected that the vehicle is in a turn mode. The turn mode is one of a right turn and a left turn. The data packet includes the rotation period determined while the vehicle is in the turn mode.

According to an example, the rotation period is a first rotation period, the wheel is a first wheel, the sensor module is a first sensor module, the unique identifier is a first unique identifier, the at least one data packet is a first data packet. A second rotation period of a second wheel is determined on the vehicle at a second sensor module associated with the second wheel. A second data packet is received at the receiver unit from the second sensor module. The second data packet includes the second rotation period and a second unique identifier for the second sensor module. A second partial localization of the second wheel is ascertained, e.g. in the utilizing operation, from the second rotation period and the second unique identifier. The second partial localization is the other of the steered wheel and the non-steered wheel.

According to an example, it is determined, e.g. as part of the utilizing operation, that the first rotation period is a shorter duration than the second rotation period. From the shorter duration of the first rotation period it is ascertained that that the first wheel is the steered wheel and the second wheel is the non-steered wheel.

According to an example, it is further detected that the vehicle is in a turn mode. The turn mode is one of a right turn and a left turn. The first data packet includes the first rotation period and second data packet includes the second rotation period each of which are determined when the vehicle is in the turn mode.

According to an example, a third rotation period of a third wheel on the vehicle is determined at a third sensor module associated with the third wheel. A third data packet is received at the receiver unit from the third sensor module. The third data packet includes the third rotation period and a third unique identifier for the third sensor module. The third data packet includes the third rotation period determined when the vehicle is in the turn mode. A fourth rotation period of a fourth wheel on the vehicle is determined at a fourth sensor module associated with the fourth wheel. A fourth data packet is received at the receiver unit from the fourth sensor module. The fourth data packet includes the fourth rotation period and a fourth unique identifier for the fourth sensor module. The fourth data packet includes the fourth rotation period determined when the vehicle is in the turn mode.

According to an example, it is determined, e.g. in the utilizing operation, that the turn mode is the left turn. When the turn mode is the left turn:

one of the first, second, third, and fourth rotation periods is identified as having a longest duration and one of the first, second, third, and fourth wheels associated with the one of the first, second, third, and fourth rotation periods having the longest duration is assigned as being the non-steered wheel on a left side of the vehicle; and another one the first, second, third, and fourth rotation periods is identified as having a shortest duration and another one of the first, second, third, and fourth wheels associated with the one of the first, second, third, and fourth rotation periods having the shortest duration is assigned as being the steered wheel on a right side of the vehicle.

According to an example, it is determined, e.g. in the utilizing operation, that the turn mode is the right turn. When the turn mode is the right turn:

one of the first, second, third, and fourth rotation periods is identified as having a longest duration and one of the first, second, third, and fourth wheels associated with the one of the first, second, third, and fourth rotation periods having the longest duration is assigned as being the non-steered wheel on a right side of the vehicle; and another one the first, second, third, and fourth rotation periods is identified as having a shortest duration and another one of the first, second, third, and fourth wheels associated with the one of the first, second, third, and fourth rotation periods having the shortest duration is assigned as being the steered wheel on a left side of the vehicle.

According to an example, a rotation direction of the wheel is determined at the sensor module. The at least done data packet includes the rotation direction and the unique identifier for the sensor module. At the receiver unit, the rotation direction is utilized to determine a second partial localization of the wheel. The second partial localization is one of a first side of the vehicle and a second side of the vehicle. The wheel is assigned to a position on the vehicle based on the unique identifier for the sensor module and the first and second partial localizations.

According to an example, it is detected that the vehicle is in a non-turning mode. The at least one data packet includes the rotation direction while the vehicle is in the non-turning mode.

According to an example, it is determined that the second partial localization of the wheel is the first side of the vehicle when the rotation direction of the wheel is a clockwise direction. For instance, the first side is a right side of the vehicle from within the vehicle and facing forward. It is determined that the second partial localization of the wheel is the second side of the vehicle when the rotation direction of the wheel is a counterclockwise direction. For instance, the second side is a left side of the vehicle from within the vehicle and facing forward.

According to an example, the wheel is assigned to a position on the vehicle based at least in part on the unique identifier for the sensor module and the first partial localization.

According to an example, a system is provided, which comprises a plurality of sensor modules and a receiver unit. Each of the plurality of sensor modules is configured to determine a rotation period for an associated wheel of a plurality of wheels on a vehicle. The receiver unit is configured to receive data packets from the plurality of sensor modules. Each of the data packets includes the rotation period and a unique identifier for the sensor module associated with the associated wheel of the plurality of wheels. The receiver unit is further configured to utilize the rotation period and the unique identifier within the data packets to ascertain a first partial localization of the associated wheel. The first partial localization is one of a steered wheel and a non-steered wheel.

According to an example, each of the sensor modules includes an accelerometer configured to provide an acceleration signal. The acceleration signal is tangential to a rotational direction of the wheel. The acceleration signal is utilized to determine the rotation period.

According to an example, the each of the sensor modules is further configured to determine a rotation direction for the associated one of the plurality of wheels on the vehicle. The receiver unit is further configured to receive the rotation direction and the unique identifier for the sensor module associated the one of the plurality of wheels. The receiver unit is further configured to utilize the rotation direction to determine a second partial location of the wheel and to assign the wheel to a position on the vehicle based on the unique identifier for the sensor module and the first and second partial localizations. The second partial localization is one of a first side of the vehicle and a second side of the vehicle.

According to an example, each of the sensor modules comprises a first accelerometer and a second accelerometer. The first accelerometer is configured to provide a first acceleration signal. The first acceleration signal is tangential to a rotational direction of the wheel. The second accelerometer is configured to provide a second acceleration signal. The second acceleration signal corresponds to a radial direction of the wheel. The first and second acceleration signals are used to determine the rotation direction.

According to an example, a method to assign a wheel to a position on the vehicle is provided. A rotation period of a wheel on a vehicle is determined at a sensor module associated with the wheel. A rotation direction of the wheel is determined at the sensor module. At least one data packet is received at a receiver unit of the vehicle from the sensor module. The at least one data packet includes a unique identifier for the sensor module, the rotation period, and the rotation direction. The at least one data packet includes the rotation period determined while the vehicle is in a turn mode. The turn mode is one of a right turn and a left turn. The at least one data packet includes the rotation direction determined while the vehicle is in a non-turning mode. The rotation period and the unique identifier is utilized at the receiver unit to ascertain a first partial localization of the wheel. The first partial localization is one of a steered wheel and a non-steered wheel of the wheel. The rotation direction and the unique identifier is utilized at the receiver unit to determine a second partial localization of the wheel. The second partial localization is one of a first side of the vehicle and a second side of the vehicle. The wheel is assigned to a position on the vehicle based on the unique identifier for the sensor module and the first and second partial localizations.

According to an example, the rotation period is a first rotation period, the wheel is a first wheel, the sensor module is first sensor module, and the unique identifier is a first unique identifier. A second rotation period of a second wheel on the vehicle is determined at a second sensor module associated with the second wheel. A second data packet is received at the receiver unit from the second sensor module. The second data packet includes the second rotation period and a second unique identifier for the second sensor module. It is determined, e.g. when utilizing the rotation period, that the first rotation period is a shorter duration than the second rotation period and it is ascertained from the shorter duration of the first rotation period that that the first wheel is the steered wheel and the second wheel is the non-steered wheel.

According to an example, it is determined, e.g. when utilizing the rotation direction, that the second partial localization of the wheel is the first side of the vehicle when the rotation direction of the wheel is a clockwise direction. For instance, the first side being a right side of the vehicle from within the vehicle and facing forward. It is determined, e.g. when utilizing the rotation direction, that the second partial localization of the wheel is the second side of the vehicle, when the rotation direction of the wheel is a counterclockwise direction. For instance, the second side being a left side of the vehicle from within the vehicle and facing forward.

According to an example, the sensor module includes a first accelerometer and a second accelerometer. The first accelerometer is configured to provide a first acceleration signal. The first acceleration signal is tangential to a rotational direction of the wheel. The second accelerometer is configured to provide a second acceleration signal. The second acceleration signal corresponds to a radial direction of the wheel. The determining the rotation period comprises utilizing successive instances of the first acceleration signal to determine the rotation period. The determining the rotation direction comprises utilizing successive instances of the first acceleration signal and the second acceleration signal to determine the rotation direction.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

LIST OF REFERENCE SIGNS

20: system;
22: TPMS modules;
24: receiver unit;
26: unique identifier;
28: data packets;
30: output data;
32: RF receiver;
34: microcontroller (MCU);
36: memory unit;
38: vehicle motion sensor(s);
40: serial link;
42: in-vehicle display unit;
44: serial link;
46: wheel position determination algorithm;
48: pressure sensor;
50: temperature sensor;
52: acceleration sensor;
54: sensor signal pre-processing circuitry;
56: microcontroller (MCU);
58: memory unit;
60: RF transmitter;
62: power source;
64: pressure signal, P;
66: temperature signal, T;
68: tangential acceleration signal, $A_X$;
70: radial acceleration signal, $A_Z$;
72: control algorithm;
74: rotation direction determination algorithm;
76: rotation period determination algorithm;
78: rotation direction data;
80: rotation period data;
82: vehicle;
84: wheels;
86: axles;
88: forward direction;
90: reverse direction;
92: TPMS data acquisition control process;
102: rotation direction determination subprocess;
104: rotation period determination subprocess;

112: rotation direction determination process;
136: maximum tangential acceleration signal, $A_{X(MAX)}$;
138: first radial acceleration signal, $A_{Z(1)}$;
140: change in tangential acceleration signal, $A_{X(C)}$;
142: second radial acceleration signal, $A_{Z(2)}$;
146: maximum tangential acceleration signal, $A_{X(MAX)}$;
148: first radial acceleration signal, $A_{Z(1)}$;
150: change in tangential acceleration signal, $A_{X(C)}$;
152: second radial acceleration signal, $A_{Z(2)}$;
154: rotation period determination subprocess;
186: first maximum tangential acceleration signal, $A_{X(MAX1)}$;
188: change in tangential acceleration signal, $A_{X(C0)}$;
190: second maximum tangential acceleration signal, $A_{X(MAX2)}$;
192: change in tangential acceleration signal, $A_{X(C2)}$;
194: first minimum tangential acceleration signal, $A_{X(MIN1)}$;
196: change in tangential acceleration signal, $A_{X(C1)}$;
198: second minimum tangential acceleration signal, $A_{X(MIN2)}$;
200: change in tangential acceleration signal, $A_{X(C3)}$;
202: wheel position assignment process;
208: state chart;
210: vehicle speed modes;
212: vehicle turn modes;
214: halt mode;
216: turn mode;
218: straight mode;
220: halt threshold value, $HALT_{THR}$;
222: straight threshold value, $STRAIGHT_{THR}$;
224: right turn mode;
226: left turn mode;
228: intermediate mode;
230: right turn threshold, $RIGHT_{THR}$;
232: left turn threshold, $LEFT_{THR}$;
234: halt mode subprocess;
238: straight mode subprocess;
240: turn mode subprocess;
246: straight mode subprocess;
262: turn mode subprocess;
282: partial localization: rotation direction;
284: rotation direction;
286: partial localization: rotation period, left turn;
288: rotation period;
290: wheel position assignments;
294: partial localization: rotation period, left turn;
296: rotation period;
298: partial localization: rotation period, right turn; and
300: wheel position assignments.

The invention claimed is:

1. A method comprising:
   determining a rotation period of a wheel on a vehicle at a sensor module associated with said wheel;
   determining a rotation direction of said wheel at said sensor module;
   receiving at least one data packet at a receiver unit of said vehicle from said sensor module, said at least one data packet including said rotation period, said rotation direction, and a unique identifier for said sensor module;
   utilizing, at said receiver unit, said rotation period and said unique identifier to ascertain a first partial localization of said wheel, said first partial localization being one of a steered wheel and a non-steered wheel;
   utilizing, at said receiver unit, said rotation direction to determine a further partial localization of said wheel, said further partial localization being one of a first side of said vehicle and a second side of said vehicle; and
   assigning said wheel to a position on said vehicle based on said unique identifier for said sensor module and said first and further partial localizations.

2. The method of claim 1, further comprising:
   detecting that said vehicle is in a turn mode, said turn mode being one of a right turn and a left turn, wherein said at least one data packet includes said rotation period determined while said vehicle is in said turn mode.

3. The method of claim 1, wherein said rotation period is a first rotation period, said wheel is a first wheel, said sensor module is a first sensor module, said unique identifier is a first unique identifier, said at least one data packet is a first data packet, and said method further comprises:
   determining a second rotation period of a second wheel on said vehicle at a second sensor module associated with said second wheel; and
   receiving a second data packet at said receiver unit from said second sensor module, said second data packet including said second rotation period and a second unique identifier for said second sensor module, wherein said utilizing operation ascertains a second partial localization of said second wheel from said second rotation period and said second unique identifier, said second partial localization being the other of said steered wheel and said non-steered wheel.

4. The method of claim 1, further comprising:
   detecting that said vehicle is in a non-turning mode, and said at least one data packet includes said rotation direction while said vehicle is in said non-turning mode.

5. The method of claim 1, wherein said utilizing said rotation direction comprises:
   determining that said further partial localization of said wheel is said first side of said vehicle when said rotation direction of said wheel is a clockwise direction, said first side being a right side of said vehicle from within said vehicle and facing forward; and
   determining that said further partial localization of said wheel is said second side of said vehicle, when said rotation direction of said wheel is a counterclockwise direction, said second side being a left side of said vehicle from within said vehicle and facing forward.

6. A method comprising:
   determining a first rotation period of a first wheel on a vehicle at a first sensor module associated with said first wheel;
   receiving a first data packet at a receiver unit of said vehicle from said first sensor module, said first data packet including said first rotation period and a first unique identifier for said first sensor module;
   determining a second rotation period of a second wheel on said vehicle at a second sensor module associated with said second wheel;
   receiving a second data packet at said receiver unit from said second sensor module, said second data packet including said second rotation period and a second unique identifier for said second sensor module; and
   utilizing, at said receiver unit, said first rotation period and said first unique identifier to ascertain a first partial localization of said first wheel, said first partial localization being one of a steered wheel and a non-steered wheel, and said utilizing operation ascertains a second partial localization of said second wheel from said second rotation period and said second unique identifier, said second partial localization being the other of said steered wheel and said non-steered wheel, wherein said utilizing operation comprises:
determining that said first rotation period is a shorter duration than said second rotation period; and
ascertaining from said shorter duration of said first rotation period that that said first wheel is said steered wheel and said second wheel is said non-steered wheel.

7. A method comprising:
detecting that said vehicle is in a turn mode, said turn mode being one of a right turn and a left turn;
determining a first rotation period of a first wheel on a vehicle at a first sensor module associated with said first wheel;
receiving a first data packet at a receiver unit of said vehicle from said first sensor module, said first data packet including said first rotation period and a first unique identifier for said first sensor module;
determining a second rotation period of a second wheel on said vehicle at a second sensor module associated with said second wheel;
receiving a second data packet at said receiver unit from said second sensor module, said second data packet including said second rotation period and a second unique identifier for said second sensor module, wherein each of said first and second rotation periods are determined when said vehicle is in said turn mode;
utilizing, at said receiver unit, said first rotation period and said first unique identifier to ascertain a first partial localization of said first wheel, said first partial localization being one of a steered wheel and a non-steered wheel, and said utilizing operation ascertains a second partial localization of said second wheel from said second rotation period and said second unique identifier, said second partial localization being the other of said steered wheel and said non-steered wheel.

8. The method of claim 7, further comprising:
determining a third rotation period of a third wheel on said vehicle at a third sensor module associated with said third wheel;
receiving a third data packet at said receiver unit from said third sensor module, said third data packet including said third rotation period and a third unique identifier for said third sensor module, wherein said third data packet includes said third rotation period determined when said vehicle is in said turn mode;
determining a fourth rotation period of a fourth wheel on said vehicle at a fourth sensor module associated with said fourth wheel; and
receiving a fourth data packet at said receiver unit from said fourth sensor module, said fourth data packet including said fourth rotation period and a fourth unique identifier for said fourth sensor module, wherein said fourth data packet includes said fourth rotation period determined when said vehicle is in said turn mode.

9. The method of claim 8,
when said turn mode is said left turn, said utilizing operation further comprises:
identifying one of said first, second, third, and fourth rotation periods as having a longest duration;
assigning one of said first, second, third, and fourth wheels associated with said one of said first, second, third, and fourth rotation periods having said longest duration as being said non-steered wheel on a left side of said vehicle;
identifying another one said first, second, third, and fourth rotation periods as having a shortest duration; and
assigning another one of said first, second, third, and fourth wheels associated with said one of said first, second, third, and fourth rotation periods having said shortest duration as being said steered wheel on a right side of said vehicle, or
when said turn mode is said right turn, said utilizing operation further comprises:
identifying one of said first, second, third, and fourth rotation periods as having a longest duration;
assigning one of said first, second, third, and fourth wheels associated with said one of said first, second, third, and fourth rotation periods having said longest duration as being said non-steered wheel on a right side of said vehicle;
identifying another one said first, second, third, and fourth rotation periods as having a shortest duration; and
assigning another one of said first, second, third, and fourth wheels associated with said one of said first, second, third, and fourth rotation periods having said shortest duration as being said steered wheel on a left side of said vehicle.

10. A system, comprising:
a plurality of sensor modules, each of said sensor modules being configured to determine a rotation period for an associated wheel of a plurality of wheels on a vehicle, and each of said sensor modules being further configured to determine a rotation direction for said associated one of said plurality of wheels on said vehicle;
a receiver unit configured to receive data packets from said plurality of sensor modules, each of said data packets including said rotation period and a unique identifier for said sensor module associated with said associated wheel of said plurality of wheels, and said receiver unit being further configured to utilize said rotation period and said unique identifier within said data packets to ascertain a first partial localization of said associated wheel, said first partial localization being one of a steered wheel and a non-steered wheel; and
said receiver unit being further configured to receive said rotation direction, utilize said rotation direction to determine a further partial location of said wheel, said further partial localization being one of a first side of said vehicle and a second side of said vehicle, and assign said wheel to a position on said vehicle based on said unique identifier for said sensor module and said first and further partial localizations.

11. The system of claim 10, wherein:
said each of said sensor modules includes an accelerometer configured to provide an acceleration signal, said acceleration signal being tangential to a rotational direction of said wheel, said acceleration signal being utilized to determine said rotation period.

12. The system of claim 10, wherein said each of said sensor modules comprises:
a first accelerometer configured to provide a first acceleration signal, said first acceleration signal being tangential to a rotational direction of said wheel; and
a second accelerometer configured to provide a second acceleration signal, said second acceleration signal corresponding to a radial direction of said wheel, said first and second acceleration signals being used to determine said rotation direction.

13. A method comprising:
   determining a rotation period of a wheel on a vehicle at a sensor module associated with said wheel;
   determining a rotation direction of said wheel at said sensor module;
   receiving at least one data packet at a receiver unit of said vehicle from said sensor module, said at least one data packet including a unique identifier for said sensor module, said rotation period, and said rotation direction, said at least one data packet including said rotation period determined while said vehicle is in a turn mode, said turn mode being one of a right turn and a left turn, and said at least one data packet including said rotation direction while said vehicle is in a non-turning mode;
   utilizing, at said receiver unit, said rotation period and said unique identifier to ascertain a first partial localization of said wheel, said first partial localization being one of a steered wheel and a non-steered wheel of said wheel;
   utilizing, at said receiver unit, said rotation direction and said unique identifier to determine a further partial localization of said wheel, said further partial localization being one of a first side of said vehicle and a second side of said vehicle; and
   assigning said wheel to a position on said vehicle based on said unique identifier for said sensor module and said first and further partial localizations.

14. The method of claim 13 wherein said rotation period is a first rotation period, said wheel is a first wheel, said sensor module is first sensor module, said unique identifier is a first unique identifier, and said method further comprises:
   determining a second rotation period of a second wheel on said vehicle at a second sensor module associated with said second wheel; and
   receiving a second data packet at said receiver unit from said second sensor module, said second data packet including said second rotation period and a second unique identifier for said second sensor module, wherein said utilizing said rotation period includes:
   determining that said first rotation period is a shorter duration than said second rotation period;
   ascertaining from said shorter duration of said first rotation period that that said first wheel is said steered wheel and said second wheel is said non-steered wheel.

15. The method of claim 13 wherein said utilizing said rotation direction comprises:
   determining that said further partial localization of said wheel is said first side of said vehicle when said rotation direction of said wheel is a clockwise direction, said first side being a right side of said vehicle from within said vehicle and facing forward; and
   determining that said further partial localization of said wheel is said second side of said vehicle, when said rotation direction of said wheel is a counterclockwise direction, said second side being a left side of said vehicle from within said vehicle and facing forward.

16. The method of claim 13 wherein said sensor module includes a first accelerometer and a second accelerometer, said first accelerometer being configured to provide a first acceleration signal, said first acceleration signal being tangential to a rotational direction of said wheel, and said second accelerometer being configured to provide a second acceleration signal, said second acceleration signal corresponding to a radial direction of said wheel, and wherein:
   said determining said rotation period comprises utilizing successive instances of said first acceleration signal to determine said rotation period; and
   said determining said rotation direction comprises utilizing successive instances of said first acceleration signal and said second acceleration signal to determine said rotation direction.

* * * * *